Jan. 7, 1936.   C. G. MUNTERS   2,027,057
REFRIGERATION
Filed Dec. 6, 1933   12 Sheets-Sheet 6

INVENTOR
Carl Georg Munters
BY
his ATTORNEY

Jan. 7, 1936.  C. G. MUNTERS  2,027,057
REFRIGERATION
Filed Dec. 6, 1933   12 Sheets-Sheet 9

INVENTOR
Carl Georg Munters
BY
Jno. T. Hedlund
his ATTORNEY

Jan. 7, 1936.  C. G. MUNTERS  2,027,057
REFRIGERATION
Filed Dec. 6, 1933   12 Sheets-Sheet 12

INVENTOR
Carl Georg Munters
BY
ATTORNEY

Patented Jan. 7, 1936

2,027,057

UNITED STATES PATENT OFFICE 2,027,057

REFRIGERATION

Carl Georg Munters, Stockholm, Sweden, assignor, by mesne assignments, to Servel, Inc., Dover, Del., a corporation of Delaware Application December 6, 1933, Serial No. 701,123
In Germany January 5, 1933

91 Claims. (Cl. 62—118)

My invention relates to refrigeration, more particularly to refrigerating systems of the absorption type, and still more particularly to refrigerating systems having low pressure periods of refrigerant evaporation (the change of refrigerant to gas phase which is the immediate or primary cause of production of cold) alternating with higher pressure periods of vapor expulsion without such evaporation. The primary object of my invention is to provide a refrigeration system of the character set forth operable without moving parts (excepting regulation devices) which is simple to control, having high efficiency, simple in construction and safe in operation.

Periodic or intermittent systems as previously manufactured comprise a boiler-absorber vessel or unit which has disadvantages. In an intermittent system, vapor is expelled from solution (or solid absorbent) and condensed and accumulated for a period of time, whereafter cooling takes place and the condensed refrigerant is evaporated and then absorbed in the absorber. With all known refrigerants and absorption liquids, it is necessary to have a system containing many times the quantity of absorption liquid to the quantity of refrigerant. If, then, all parts of the body of solution of refrigerant in absorption liquid, or a substantial portion thereof, are simultaneously heated with similar temperature rise from the temperature at which absorption takes place to the temperature at which the vapor expulsion and simultaneous condensation take place, heat must be added not alone to drive off the vapor of the refrigerant but to raise the temperature of the entire body of liquid subject to uniform heating, so that the entire body has at a given time so high a temperature as permits vapor expulsion for condensation. The heat applied to raise the temperature of the absorption liquid per se from absorption temperature to expulsion temperature is wasted. It is an object of my invention to avoid this wasted heating of a relatively large part of the entire quantity of absorption liquid in the system during each cycle to the extent corresponding to such quantity multiplied by the temperature for condensation difference between expulsion temperature and absorption temperature.

In prior generally known periodic absorption refrigeration apparatuses, the entire body or substantially the entire body of absorption liquid is at expulsion temperature at the beginning of or just prior to the absorption period. This liquid must first be cooled down before absorption begins and therefore time is lost. It is an object of my invention to reduce the time interval between expulsion and absorption periods in an intermittent absorption refrigeration system.

Because of the heat loss resulting from heating the absorption liquid as such, cycles of intermittent apparatus have been made long so that this useless heating would take place as seldom as possible. It is one object of my invention to decrease the time per cycle of an intermittent absorption system.

Instead of heating the solution or any substantial part thereof as a single body, I heat it a little at a time to expulsion temperature, withdraw the weakened absorption liquid as soon as the refrigerant is expelled therefrom, immediately cool it below vapor expulsion temperature and preferably to sufficiently low temperature to be capable of immediately absorbing refrigerant, the cooling taking place while the heating is continuing as to more of the strong absorption liquid, and store the cooled absorption liquid so that it will be ready for quick action as soon as the absorption period starts, but so that it will not adversely affect the vapor expulsion. I preferably cool the weakened absorption liquid by means of cold strong absorption liquid flowing to the heated zone, to which may, and preferably is, added external cooling.

In intermittent systems, the liquid volume variation of the solution must be taken care of. In hitherto known intermittent systems, the factors of heating for vapor expulsion, cooling for absorption and liquid volume variation have been localized in the same vessel or unit having substantially equalized temperature condition. If the vessel in which absorption takes place is also the vessel in which the liquid volume variation shall take place, there will be present a gas space above the absorption liquid. If such gas space is in direct gas communication with the place of vapor expulsion, and if it should be kept cool during the expulsion period, it would afford a cooling source for condensation or absorption of expelled vapor detracting from the effectiveness of vapor expulsion or rate of condensation in the condenser. I propose to take care of the variation of volume of solution in a space which is not subject to cooling during the expulsion period and which is also separate from the main body of absorption liquid, and to thermally isolate the main body of absorption liquid from the vapor expeller. Preferably I provide separate components for expulsion, liquid storage, and volume variation. I also preferably thermally isolate the space for volume variation of solution from the vapor expeller and the main cold body of absorption liquid and maintain a stagnant surface therein during the expulsion periods. Due to these and other features of my invention, I am able to limit the heat applied to approximate the heat requirement for expelling the refrigerant vapor, without necessity of simultaneously raising the temperature of any appreciable part of the solution contained in the system. In my system, in the last analysis, I raise the temperature of all the absorption liquid to a point so as to expel vapor therefrom, but I heat only a small part of the absorption liquid during any incremental time part of the vapor expulsion period and I recapture such proportion of the heat as serves to raise the temperature of the absorption liquid as such by transfer of such heat into another part of the absorption liquid so that, in effect, part of the absorption liquid, and preferably the greater part of the absorption liquid, is or can be maintained in cold condition while only a part, and preferably a very small part of the absorption liquid, is being heated to vapor expulsion temperature. In accordance with my invention, the greater proportion of the absorption liquid is maintained at a lower, or at least as low a temperature during the higher pressure period than during the lower pressure period while a constant cooling facility is maintained except as modified by variation in heating.

In accordance with what I have pointed out above, the space in the system which is cooled for removal of heat of absorption or the body of cooled weakened solution shall not during the expulsion period short-circuit the flow of refrigerant vapor from the place of expulsion to the place of accumulation of refrigerant. In case such space contains absorption liquid during the vapor expulsion period, it should be filled full with liquid during such period, so that no absorption or condensation can take place therein, even though such space be at a temperature lower than and even very much lower than the temperature of vapor expulsion. This may be otherwise expressed by stating that such absorption liquid in the externally cooled vessel or element shall be free of gas environment. This condition shall also hold true regardless of the placing of the main body of absorption liquid or whether cool absorption liquid is at the same or a higher elevation than the place of heating. This condition can also be obtained by draining the absorption liquid from such cooled vessel or element when the expulsion period begins and utilizing such vessel or element as a condenser or for some other function not permitting short-circuiting of the vapor back to the absorption liquid. I also provide apparatus whereby non-mechanical internal agencies operate due to forces generated within the system (that is, without force transmission through the wall of the apparatus) so as to prevent any or all absorption to take place during the vapor expulsion period, preferably by the provision of liquid seals, but which automatically cause gas-flow into the absorber and absorption to take place during the absorption period.

It is a further object to make such seals with a minimum of effort within the system. Their height should be as low as possible because the raising of liquid columns or seals is not directly useful work in producing refrigeration. I therefore admit refrigerant vapor into absorption liquid at a high level of the liquid containing part of the system, since the higher this level, the lower need be the height of liquid altered to effect the introduction of the refrigerant vapor into the absorption liquid. On the other hand, in heating the absorption liquid a little at a time throughout the expulsion period, stability of condition is desirable and this is best accomplished at a level where liquid is not too greatly affected by variations in volume or height of liquid. By using a small stream of liquid heated at a considerably submerged point in the liquid system, I can obtain stability of flow and uniformity of heating. Therefore I prefer to have absorption liquid which is cool or cooled during the expulsion period at as high or even higher level than the place of heating, and therefore I provide a thermal isolating means between refrigerant vapor and absorption liquid during expulsion periods separate from and in addition to the thermal isolation afforded by the stream flowing between the main body of absorption liquid and the heated zone.

I preferably make the heated stream of liquid so narrow that vapor bubbles extend substantially full width of the channel, to obtain uniformity of flow of liquid while quantity of absorption liquid varies.

I utilize internal factors for cooling the residual hot fluid at the end of the expulsion period and for hastening the change-over between periods. It has been generally suggested to use an external cooling source to dissipate the residual generator heat. I accomplish this internally by flow of refrigerant vapor due to cool liquid in the system separate from the residual hot liquid. Preferably I withdraw vapor from the gas space of the generator and contact the withdrawn vapor with absorption liquid of lower temperature than the temperature of absorption liquid in the generator. With this and other features I am able to have constant heat rejecting facility throughout both periods except as modified by variations in heating.

The nature, objects and advantages of my invention will be apparent from the following description, considered in connection with the accompanying drawings forming part of this specification of which:

Fig. 1 is an elevational view partly in vertical section of a refrigeration apparatus embodying my invention;

Fig. 2, a similar view of another embodiment of my invention;

Fig. 3, a similar view of a still further embodiment of my invention;

Fig. 4, a rear view of a refrigeration apparatus similar to that in Fig. 2, mounted in a refrigerator cabinet;

Fig. 5, a side view of the refrigerator shown in Fig. 4, partly in vertical section;

Fig. 6, a schematical view with parts in vertical section of the control valve mechanism indicated in the other figures;

Figure 1:
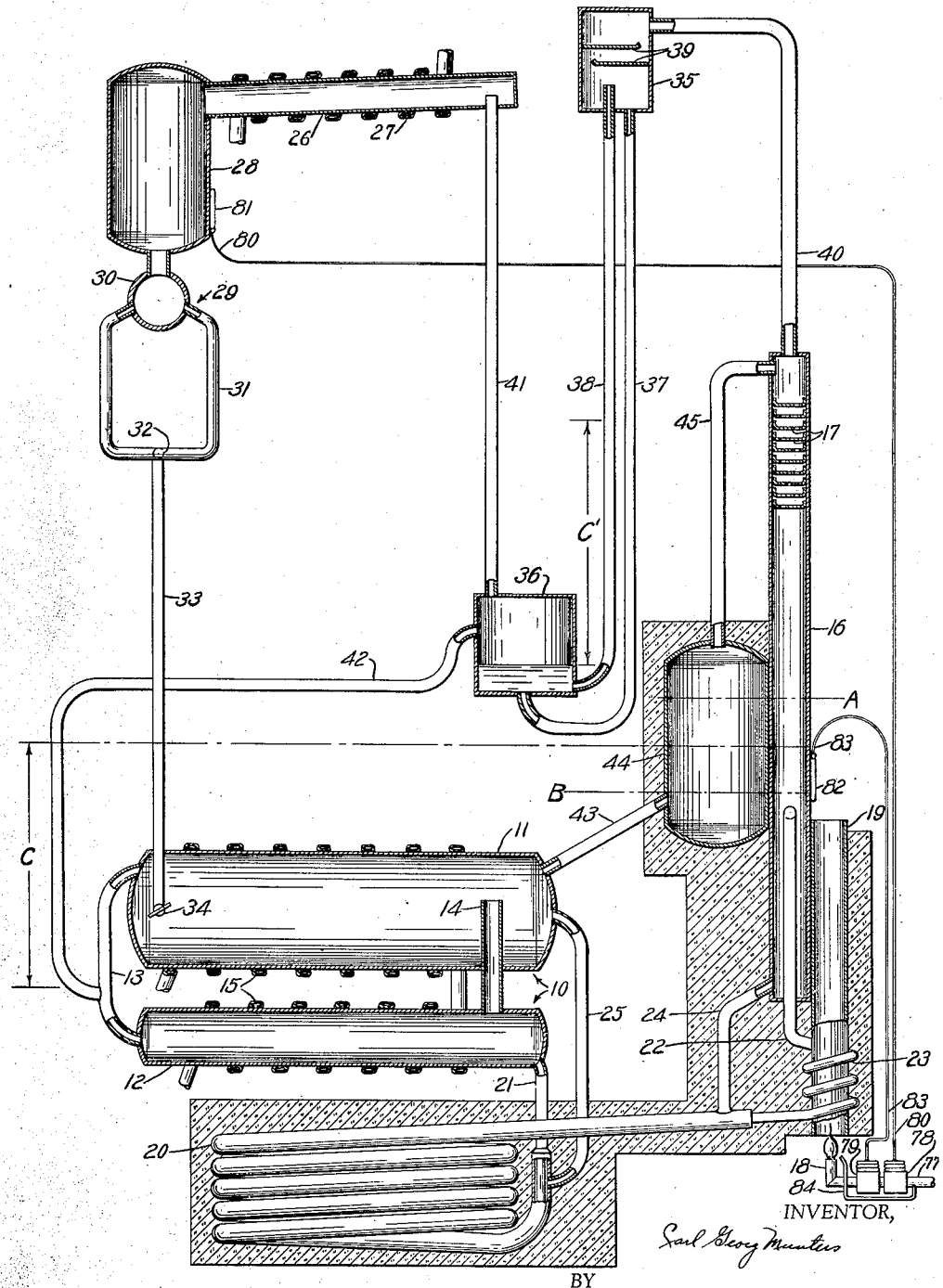

Referring to Fig. 1 of the drawings, the system illustrated comprises an absorber-reservoir 10, a generator 16, a liquid heat exchanger 20, a condenser 26, an evaporator 29, a liquid column trap including a lower vessel 36, an upper vessel 35, and conduits 37, 38, a thermosiphon element 23, other parts to be hereinafter described and conduits interconnecting all the various elements. Generally the various vessels and conduits are made of metal such as steel and shaped to best withstand internal pressures, the conduits being generally round and the vessels cylindrical with rounded closed ends. All the parts are in open and unobstructed fluid communication with each other. While certain terms are applied to the various parts for purposes of description, and in the claims the parts are identified by specific names for convenience, it is to be understood that the terms are intended to be as generic in their application to similar parts as the art will permit, and it is to be understood that specific description of the apparatus is by way of example and not by way of limitation of the broad nature of the invention.

The absorber-reservoir 10 comprises an upper vessel 11 and lower vessel 12 interconnected by conduits 13 and 14. The conduit 13 connects one end of the lower vessel 12 with the upper part of the upper vessel 11. The conduit 14 connects the upper part of the lower vessel 12 with the upper vessel 11 considerably above the lower part of the latter. The absorber vessels 11 and 12, together with the conduits 13 and 14, form what may be termed a local absorber circuit for absorption solution. The absorber vessels 11 and 12 are cooled by circulation of water through a coil 15 extending around both of the vessels in good thermal contact therewith. The parts thus cooled by water may, in the alternative, be cooled by air.

The generator 16 comprises a vertically disposed closed steel tube adapted to contain in the lower part thereof a quantity of liquid that is relatively very small compared to the quantity adapted to be contained in the absorber-reservoir 10. The volume of liquid adapted to be contained in the generator 16 and therefore the heat storage capacity thereof is very small compared to generators heretofore proposed in intermittent apparatuses. In the upper part of the generator 16 are baffle plates 17. This part of the generator is above the normal liquid level and constitutes a rectifier and it will be obvious that such rectifier may be formed as a separate vessel connected to receive vapor from the generator and the height of the latter decreased correspondingly. The generator may be heated in any desired way as by an electric heater, oil burner, steam jacket, gas flame, or the like. For purposes of illustration, and because the apparatus shown in Fig. 1 was so built, I have shown a gas burner 18 directed into a heating flue 19 which latter is disposed in good thermal conductive relation with the lower or liquid containing portion of the generator 16. Obviously the flue may extend through the generator or be otherwise arranged for effective heating of the latter.

A circuit for absorption solution is provided between the generator 16 and the absorber-reservoir 10 including a liquid heat exchanger 20. The latter is of the coiled concentric tube type, that is comprising an inner tube extending concentrically through an outer tube forming an annular space therebetween so that liquid may be conducted through the inner tube in good thermal exchange relation with liquid flowing in the annular space. For conservation of space, the tubes are arranged in the form of a coil. It will be obvious that other forms of liquid heat exchanger may be used if desired. One end 21 of the inner tube of the liquid heat exchanger 20 is connected to the lower absorber vessel 12 and the other end is formed as a coil 23 around the lower end of the heating flue 19 and then extends upwardly with a rising portion 22 to the generator 16. At least the portions 23 and 22 of this conduit are preferably of sufficiently small diameter that gas and liquid cannot pass each other therein (disregarding a thin skin of liquid on the wall of the conduit) wherefore vapor bubbles formed in the coil section 23 exert a lifting action on the liquid therein to create an upward flow. These tube sections 23 and 22 comprise a thermosiphon element or lift. The reaction head on the thermosiphon is the column of liquid from the surface in vessel 44 downwardly in conduit 43 and in the absorber-reservoir and conduit 21. There is thus a substantial height of liquid above the thermosiphon. The reactive hydrostatic head for the vapor lift is greater than the hydrostatic head under which cooled absorption liquid is stored in reservoir 10. Instead of the coil 23, a thermosiphon or circulator construction of other known kind may be used, for example as shown in Letters Patent of the United States to Lenning No. 1,645,706 of October 18, 1927. The upper end of conduit 22 where it is connected to the generator 16 is preferably higher than the top of the absorber vessel 11 though this height is not critical as long as sufficient height is obtained in coil section 23 and rising section 22 to obtain sufficient gas lifting action to produce circulation between the absorber-reservoir and generator as hereinafter set forth. The lower end of the generator 16 is connected to the upper absorber vessel 11 through conduit 24, the annular passage of the liquid heat exchanger 20, and conduit 25. The lower part of the generator 16, the heating flue 19, and liquid heat exchanger 20 are preferably thermally insulated, as illustrated, to reduce heat losses due to radiation and otherwise. The upper part of the generator 16 in which are located the baffles 17 is exposed to the atmosphere and external flanges, not shown, may be applied to facilitate cooling at this point.

The condenser 26 is cooled by circulation of water through a coil 27 arranged in good thermal exchange relation therewith. Obviously the condenser may be of other forms and cooled in any desired manner as by air or an indirect cooling system. The condenser and the absorber may be connected to be cooled in parallel or in series.

Connected between the condenser 26 and the generator 16 is a liquid column trap arrangement comprising an upper vessel 35 and a lower vessel 36 interconnected by conduits 37 and 38. A conduit 40 connects the upper end of the generator 16 with the upper part of vessel 35. A conduit 41 connects the upper part of the lower vessel 36 with the upper end of the condenser 26. Conduit 37 is connected at its upper end to the bottom of the upper vessel 35 and is looped downwardly below the vessel 36 and connected to the bottom of the latter. The upper end of conduit 38 extends upwardly into vessel 35 and is connected at its lower end to vessel 36 slightly above the opening of conduit 37. The upper vessel 35, which is preferably exposed so as to be cooled, is provided with internal baffles 39 which are preferably adapted to retain small amounts of absorption liquid thereon condensed in this vessel.

The cooling element or evaporator, designated generally by the reference character 29, comprises a cylindrical manifold or header 30 connected to receive liquid from a reservoir 28. The latter comprises a closed cylindrical vessel connected at its upper portion to receive condensed refrigerant from the lower end of the condenser 26. Connected to the evaporator manifold or header 30 is a plurality of depending tube loops 31 which are preferably cross-connected at the bottom at 32. This type of evaporator is somewhat more fully illustrated in Figs. 4 and 5. The reservoir 28 may be insulated. This is not illustrated in Fig. 1 but in Figs. 4 and 5 there is shown a similar type evaporator with a horizontal reservoir, the latter being embedded in the insulation of the refrigerator in which the evaporator is located. The insulation of reservoir 28 is preferably of small storage capacity and metal foil may be used as disclosed in my co-pending application Serial No. 613,351 filed May 25, 1932. Obviously the evaporator is not limited to the type illustrated but may be of any type adapted to hold a quantity of liquid refrigerant. From the bottom of the evaporator 29 a drain conduit 33 is connected to the upper absorber vessel 11, this conduit being provided with a normally closed drain valve 34. This connection is for the purpose of returning from the evaporator 29 to the absorption solution circuit any liquid absorbent that may accumulate in the evaporator. Obviously the drain connection 33 and manually operated valve 34 may be replaced by an automatic drain arrangement such as a siphon or overflow connection which latter is disclosed in Figs. 4 and 5 and hereinafter described.

A conduit 42 is connected from an intermediate part of vessel 36 to the lower part of conduit 13 between the upper and lower absorber vessels 11 and 12. Slightly above the absorber vessel 11 and connected thereto by a small conduit 43 is a closed cylindrical vessel 44. The latter is preferably arranged in thermal transfer relation with the generator 16 and is preferably thermally insulated from the atmosphere, as shown. Since substantially no simultaneous movement of liquid in different directions can take place in the small conduit 43, any liquid in vessel 44 will be relatively stagnant with respect to movement of liquid in the absorber. The top vessel 44, which may be referred to as a standpipe or stagnant liquid vessel, is connected through a conduit 45 to the upper end of the generator 16 above the baffle plates 17. The arrangement of vessel 44 with respect to the generator is one only of convenience in maintaining the temperature of the vessel 44 at a higher value than the temperature of the absorber-reservoir and the condenser and obviously the vessel may be arranged to be maintained at this higher temperature in any desired manner. It is noted that heating of the vessel 44 is not imperative to operation of the system but it is maintained at a higher temperature to reduce to a minimum condensation of refrigerant vapor from the generator and absorption thereof during the expulsion period, as hereinafter explained.

The system is charged with a solution of refrigerant such as ammonia in an absorption liquid such as water which has preferably been purified by distillation. Obviously other refrigerants and absorbents may be used. Since the methods of charging absorption refrigeration apparatus are well known in the art the charging connections and apparatus are not illustrated. The system is filled with the water solution of ammonia to approximately the level A. If desired, the apparatus may be filled to the level above the opening of conduit 42 in the vessel 36 so that some solution flows into the bottom of the latter and then drained by means of a suitable valve in vessel 44 down to level A leaving liquid trapped in the lower part of vessel 36 and the lower ends of conduits 37 and 38 for the purpose hereinafter described.

The gas burner 18 is supplied with gas through conduit 77 provided with suitable valve mechanism for turning off and on the supply of gas to the burner. Around the mechanism is a small by-pass conduit 84 to provide a so-called pilot light adjacent the tip of the burner 18 so that the latter will automatically be ignited when the supply of gas thereto is turned on by the valve mechanism.

The valve mechanism may be formed as a single automatic valve but for purposes of simplicity of explanation I have shown two valves and the system is operable by the use of these two separate valves. In Fig. 6 the valves are shown schematically but in more detail. The first valve 78 is an automatic thermostatic valve operative in response to variations of temperature of the liquid refrigerant reservoir 28. Referring more particularly to Fig. 6, a casing 85 is divided by a partition 86 into two chambers communicating through a valve opening 87 in the partition. Gas from conduit 77 enters the lower chamber 88, passes through the valve opening 87 when the latter is opened, and leaves the upper chamber 89 through conduit 90. The valve passage 87 is controlled by a valve member 91 carried by a valve stem 92. The lower end of the latter is suitably guided and the upper end is connected to the movable end of a thermostat bellows 93 in the upper chamber. The bellows 93 is connected through a capillary tube 80 to a sensitive bulb 81 located on the reservoir 28 in good thermal exchange relation therewith. The bellows 93, capillary tube 80, and sensitive bulb 81 comprise an expansible fluid thermostat which may be charged with any suitable fluid such as butane or propane. A spring 94 is provided to normally maintain the valve member 91 closed and is of such strength as to prevent opening of the valve by expansion of the thermostat until the temperature of the reservoir 28 rises above a certain predetermined value, for instance $-5°$ C. ($23°$ F.). For efficient valve operation the coiled spring 94 may be replaced by a snap action spring or toggle as well known in the art so that when the opening pressure of the thermostat reaches the predetermined upper limit the valve will be fully opened with a snap action. Obviously any suitable type of automatic valve may be provided which is operable to open upon a predetermined rise in temperature of the evaporator reservoir.

The second valve 79 is generally of the same type as the previously described valve 78 except that this valve is adapted to close at a predetermined upper temperature or pressure limit and open at a predetermined lower temperature or pressure limit. This valve comprises a casing 95 separated by a partition 96 into an upper chamber 97 and a lower chamber 98 communicating through a valve passage 99 in the partition 96. Gas from conduit 90 enters the upper chamber 97, passes through the valve passage 99 when open, into the lower chamber 98, and thence to the burner 18. The valve passage 99 is controlled by a valve member 100 on a valve stem 101 connected at its upper end to be operated by a thermostat bellows 102. The latter is connected through a capillary tube 83 to a sensitive bulb 82 arranged in thermal exchange relation on the generator 16 approximately at the lower liquid level in the latter. The valve member 100 is arranged to close the valve passage 99 upon expansion of the thermostat bellows 102 and open the passage upon contraction of the bellows. The valve stem 101 is provided with a pair of diagonally opposite projections or cams 103 which, on vertical movement of the valve rod, must be moved past a pair of cooperating springs 104. The latter are arranged as shown so that the valve member 100 is moved to either its open or closed position with a snap action. The thermostat is charged with a suitable expansible fluid and the previously described snap action device so adjusted that the valve is snapped closed when the generator reaches a predetermined maximum temperature of, for instance, 150° C. (302° F.) and is snapped open when the generator decreases to a minimum temperature of, for instance, 80° C. (176° F.). As well known in the art the snap action arrangement on this valve may be replaced by a suitable over-center snap action spring or toggle. Obviously any suitable valve of this general type may be employed.

After the pilot 84 has been lighted, the burner 18 will be lighted only when both valves 78 and 79 are open, but it will be turned off when either of said valves is closed. When the system described above in connection with Fig. 1 is first put into operation, both valve operating thermostat bulbs are at substantially room temperature wherefore both valves 78 and 79 are open and the burner and pilot are lighted by opening the usual line shut-off valve, not shown. The burner applies heat through the flue 19 to both the generator 16 and thermosiphon coil 23. Due to the small volume of liquid in the generator, the temperature thereof is rapidly raised to the point at which ammonia vapor distilled from the solution raises the pressure in the system sufficiently to permit condensation to take place. The gas which is formed in the thermosiphon coil 23 makes the column of fluid therein considerably lighter than the liquid in other portions of the solution circuit wherefore absorption solution flows upwardly through conduit 22 into the generator 16. Solution flowing upwardly through conduits 23 and 22 is replaced through the inner tube of the liquid heat exchanger 20 from the lower absorber vessel 12, while solution in the generator 16 returns through conduit 24, outer passage of the liquid heat exchanger 20, and conduit 25 into the upper absorber vessel 11. Since ammonia vapor is distilled from solution both in the thermosiphon coil 23 and in the generator 16, the solution returning from the generator to the absorber-reservoir and entering the upper absorber vessel 11 through conduit 25 is of low ammonia concentration and is referred to as weak solution or weak absorption liquid. This weak solution entering the upper absorber vessel 11 is of greater specific gravity than the rich or high ammonia concentration solution and therefore sinks to the bottom of the upper absorber vessel below the upper end of conduit 14 displacing rich solution upwardly, which then flows through conduits 13 and 14 to the lower absorber vessel 12. In this manner, solution in the absorber-reservoir is not diluted by returning weak solution but is circulated on through the heat exchanger to the generator via the thermosiphon circulation element. The absorber vessels 11 and 12 may be provided with suitable baffles to substantially prevent intermixture of the strong and weak solution or the absorber may be of the coil type comprising a tube of sufficiently small cross section to form a definite circuit for the solution.

At the beginning of the vapor expulsion period, the amount of liquid contained in the generator 16 and thermosiphon coil 23 (which is also a generator or expeller) is first heated. This is but a small part of the total amount of solution contained in the system. After vapor is expelled from this part of the solution, more solution is fed to the heated zone due to the lifting effect of the thermosiphon. Thus the solution is heated a little at a time to vapor expulsion temperature. As soon as vapor is expelled from any part of the solution, the resulting weak solution is conducted away from the heated zone, through conduit 24, and is immediately cooled. Conduit 24 is not in heat exchange relation with the source of heat since vapor formed therein would tend to oppose the desired circulation. This active cooling during the expulsion period is accomplished by the cold rich solution passing to the thermosiphon member 23. The arrangement of parts is such that although cooled liquid in vessel 11 is held above the heated zone in member 23, vapor will not pass into vessel 11 through the heat exchanger. It will also not pass through member 16 due to the stagnant liquid in vessel 44 and conduit 42. The heat exchanger should be amply long to cool the weak absorption liquid to approximately the temperature of the rich solution leaving the absorber-reservoir. The cooled weak solution enters the absorber-reservoir through conduit 25 and is stored in the absorber-reservoir awaiting the initiation of the absorption period.

The ammonia vapor expelled from solution in the thermosiphon coil 23 and in the generator and separator vessel 16 passes upwardly in the latter through the baffles 17. The upper part of the generator being at a lower temperature than the heated lower portion, water vapor condenses out of the ammonia and flows back into the lower part of the generator over the baffles 17. The ammonia vapor continues upwardly through the conduit 40 into the upper trap vessel 35. If the latter is cooled by exposure to the atmosphere, some condensation of remaining water vapor occurs, the liquid flowing downwardly over the baffles 39 and draining through conduit 37 toward the lower trap vessel 36. Thus it is not absolutely necessary to charge the apparatus so that vessel 36 will receive some solution as previously described, since the condensate draining from vessel 35 through conduit 37, which occurs when vessel 35 is cooled, seals off the lower ends of conduits 37 and 38 in the lower trap vessel 36. The ammonia vapor flows downwardly through conduit 38 bubbling through the liquid in vessel 36 and then upwardly through conduit 41 to the condenser 26.

In the condenser, ammonia vapor is condensed to liquid which drains from the lower end of the condenser into the liquid refrigerant reservoir 28 and evaporator 29. Due to the increased pressure in the system during this expulsion period, the liquid ammonia merely accumulates in the evaporator and reservoir 28. Due to the distillation of ammonia in the thermosiphon 23 and generator 16, the liquid level drops in the generator 16, vessel 44, and conduit 42. The latter serves as an overflow for excess liquid from vessel 36 back to the liquid circuit.

During this expulsion or heating period, cooling water may flow continuously through the coil 15 around the absorber vessels whereby the weak solution is further cooled and the main body of absorption liquid contained therein is maintained at low temperature. This may be approximately 20° C. (68° F.) while the temperature within the generator is rising to approximately 150° C. (302° F.), wherefore the temperature of the generator is roughly 100° C. (212° F.) higher than the temperature in the absorber-reservoir. The liquid in the absorber-reservoir is therefore maintained during the heating period at such a temperature as to be immediately available for absorbing refrigerant vapor upon decrease in pressure in the system, and, as previously set forth, the heat storage capacity of the generator being relatively very small, the cooling thereof to produce reduction in pressure may be accomplished very rapidly as hereinafter described. In the system shown, the ratio of liquid volume in the generator to that of the absorber-reservoir is roughly 1 to 30. This ratio of course is in nowise critical but merely indicative of the large volume of cool solution immediately available for absorption compared to the small volume of hot solution to be cooled upon instigation of the absorption or refrigeration period.

During the expulsion period, a small continuous stream of cool rich solution from the absorber flows through the heat exchanger 20 in counterflow to and thermal exchange relation with a return stream of hot weak solution flowing from the generator to the absorber. Due to the transfer of heat from the hot weak solution to the cool rich solution in the liquid heat exchanger, a certain amount of heat input is conserved or recaptured to raise the temperature of the rich solution toward the generator temperature and prevent dissipation of heat in the absorber.

The vessel 44 is separate from the absorber and provides a space separate from the absorber for taking care of the liquid volume variation of the absorption liquid so that the absorber does not have to carry out this function. This vessel is connected to the generator. In this embodiment, it will be appreciated that if the absorber-reservoir were connected to the generator by a gas channel and there were gas space above the liquid in the absorber-reservoir and the absorber-reservoir were maintained at a lower temperature than that of condensation of the refrigerant vapor, the absorber-reservoir would draw on the refrigerant vapor, and condensation and absorption of refrigerant vapors would take place in the absorber-reservoir, thereby preventing operation of the apparatus or taking away from the condenser its function so as to render the apparatus ineffective or very inefficient. The thought might occur to use a cooled absorber having a normal gas space which can be filled up with condensed ammonia after which condensation can take place in the main condenser. Such a system, however, would be inefficient and probably inoperative because the rich layer of condensed ammonia in the absorber would prevent the absorption of the refrigerant in the absorption period. The vessel 44 acts as a closure in the line of communication between the generator and the absorber-reservoir. It contains the stagnant surface layer of the absorption liquid at a different temperature than the temperature of the absorber-reservoir itself, or that part of the absorption liquid system which is exposed to the external cooling source, so that it is possible to obtain stagnation of liquid surface and prevent any appreciable condensation and absorption of the refrigerant vapor during the vapor expulsion period without adversely affecting the absorption operation when the absorption period begins.

From the above it will be apparent that, during the expulsion period, the solution is segregated into three principal parts, of which one part is the main body and is maintained cool or actively cooled; another part of very small volume is heated to produce the refrigerant vapor; and a surface layer of the main body is segregated from the circuit thereof and maintained at a temperature greater than the temperature of the condenser and of the main body. We may go further and say that the solution is divided into four principal parts, namely the three parts identified as aforesaid, and also the part which is in the heat exchanger, as it is important that there be heat exchanged between the liquid flowing from the absorber to the generator on the one hand, and from the generator to the absorber on the other hand to maintain a temperature gradient between the small heated portion and the large portion of the absorption liquid maintained at low temperature.

When the generator temperature reaches a predetermined value, for example, 150° C. (302° F.), the automatic gas valve 79 snaps closed as previously described, turning off the burner 18. Due to distillation of ammonia the solution has fallen to a lower lever B. We now have a condition where vapor generation is stopped but cooling of the absorber-reservoir continues. No control of the cooling water is necessary. As previously set forth, the generator and thermosiphon member are constructed so as to have such a small heat storage capacity that cooling thereof occurs rapidly which is accomplished by a rapid drop in pressure. This drop in pressure is augmented by absorption of vapor into solution deposited on the walls of the upper part of the generator, pipe 40, and on the baffles 17 and 39 in the generator and upper trap vessel 35, respectively. This decrease in pressure is transmitted to the absorber through conduit 45, vessel 44, and conduit 43. This decrease in pressure exerted in conduits 37 and 38 causes the liquid column to rise therein. If the reduction in pressure is too rapid, liquid may surge upwardly through conduits 37 and 38, thus breaking the seal, but this condition is compensated for by the longer loop in conduit 37. The liquid column in conduit 38 would be displaced first and the liquid coming out of the upper end of pipe 38 would flow back downwardly through conduit 37 to maintain the liquid seal between the evaporator and generator.

As the generator pressure decreases, the liquid level rises in conduits 37 and 38 and rises slightly in vessel 44, and the liquid level decreases in conduit 42. Since all of the parts of my system are in open communication, the difference in liquid levels in vessel 36 and conduits 37 and 38 is the same as the difference in liquid levels in conduit 42 and vessel 44. The columns of liquid continue to adjust themselves until the liquid level in conduit 42 falls to the opening of this conduit in the rising conduit 13 between the absorber vessels 12 and 11. At this time the liquid column C in the absorber-reservoir is the same as the liquid column C' in the trap as indicated in Fig. 1. Since these two columns balance, the higher the point of admission of vapor into conduit 13 is in the liquid portion of the system, the lower need be the column C' for exerting the pressure on the vapor. The refrigerant vapor now passes from conduit 42 into conduit 13 where it flows upwardly and is absorbed into the cool weak solution in the absorber-reservoir. Due to the reduction in pressure above the liquid ammonia in the evaporator 29 and reservoir 28, evaporation occurs, the heat of vaporization being supplied by the liquid ammonia whereby the temperature thereof is reduced below that of the surrounding medium and transfer of heat from the latter to the evaporator takes place thus producing a refrigerating effect. The ammonia vapor introduced from conduit 42 into conduit 13 decreases the specific weight of the column in the latter thereby producing an upward flow of solution. This flow may be increased by constructing conduit 13 of such small diameter that vapor cannot readily pass the liquid therein whereby the vapor exerts a lifting effect on the liquid the same as in the thermosiphon element 23, 22. The upward flow of solution in conduit 13 creates circulation of solution through the absorber between the upper and lower vessels 11 and 12 which are both cooled for removal of heat of absorption. Preferably the absorber vessels are so arranged and the points of communication of the conduits 13 and 14 so chosen that, during the absorption period, rich solution can enter the lower end of pipe 13 only when the entire quantity of solution in the absorber has become enriched. Similarly this arrangement should be so selected and conduits 21 and 25 so connected that during the heating period weak solution reaches the opening of conduit 21 only when the entire quantity of solution contained in the absorber has become weakened. With the absorber-reservoir continuously cooled it will be understood that the absorber-reservoir will normally have a lower temperature during the expulsion period than during the absorption period since the temperature is raised during the absorption period due to the heat of absorption.

Evaporation of refrigerant in the evaporator 29 continues until the temperature of the reservoir 28 has risen to, for example, —5° C. (23° F.) when the thermostatic gas valve 78 (which previously has been closed due to lowering of the evaporator temperature below —5° C.) opens as previously described. Since the generator has cooled in the meantime to below 80° C. (178° F.), the thermostatic gas valve 79 is also open wherefore upon opening of the valve 78 gas is again supplied to the burner which is ignited from the pilot 84 and another heating period starts. The pilot flame should be just sufficient to light the burner but not heat the generator, that is, heat from the pilot should be a minimum and dissipated to the atmosphere. Upon instigation of the heating or expulsion period the pressure rises in the upper part of the generator whereupon the liquid column C' is lowered, the liquid level drops in vessel 44, and liquid rises in conduit 42. The absorption thus stops, and vapor is again generated to be condensed and accumulated in the evaporator and the cycle is repeated.

Fig. 1 is a drawing to scale of an apparatus actually built and operated. The height of the generator is 55 centimeters (21.65 in.) and from this dimension the size of the other parts of the apparatus can be obtained since all of the vessels and conduits shown are cylindrical. The system was charged with 5 liters (1.32 gallons) of water solution of ammonia having a concentration of 38% ammonia and containing about 1% of sodium chromate as an anti-corrosion agent. Water from the city supply was circulated through the absorber and condenser cooling coils 15 and 27 and the gas burner 18 lighted. At the end of a heating period of one hour the gas was shut off after which there was a lapse of about five minutes until vapor from the evaporator started to bubble into the absorber through conduit 13. With the inlet cooling water at a temperature of approximately 9.2° C. (48.5° F.) the pressure in the system at the end of the heating or generating period was 6.5 kilograms per square centimeter absolute (approximately 92.5 pounds per square inch). Thirty minutes after shutting off the gas the evaporator temperature was —1.5° C. (29.3° F.) and the pressure was 3.4 kilograms per square centimeter (approximately 48.4 pounds per square inch). One hour after shutting off the gas the evaporator temperature was —8° C. (17.6° F.) and the pressure 2.5 kilograms per square centimeter (approximately 35.56 pounds per square inch). The evaporator was not insulated and the room temperature was at an average of 19.3° C. (66.7° F.). The previously described thermostatic control was not used and the burner was turned on and off with a hand valve but it will be clear that the automatic control performs the same function as a manually operated valve.

In this system the evaporator may be provided with an auxiliary liquid which is of less specific gravity than ammonia and insoluble therewith. Such liquid excludes hot vapor from the evaporator during the heating periods and is displaced upwardly by the heavier ammonia condensate as taught in my copending application Serial No. 413,706 filed December 13, 1929, Pat. No. 1,960,824.

Figure 2:
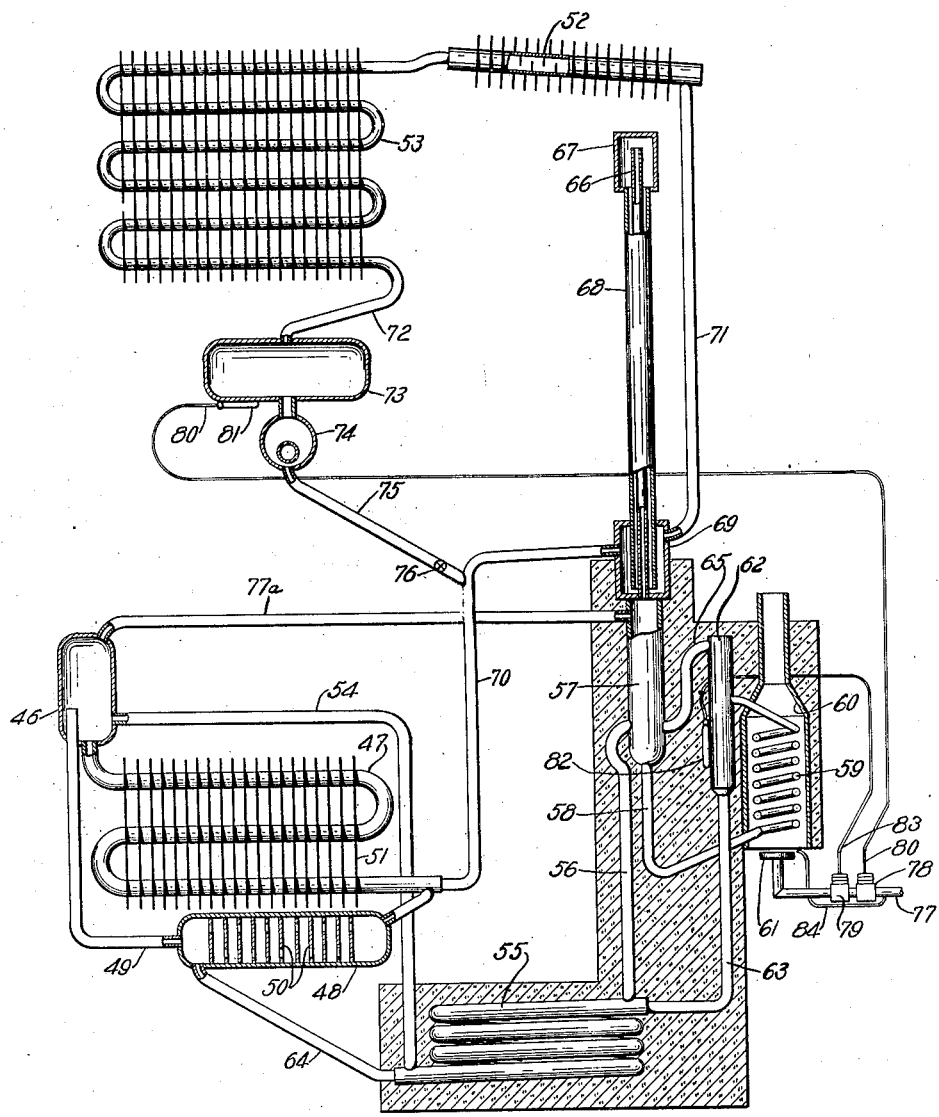

Referring to Fig. 2 of the drawings, there is shown an absorption refrigeration system constructed in accordance with my invention which operates similarly to the system described in connection with Fig. 1. In this system both the absorber and condenser are cooled by air. The apparatus comprises an upper vessel 46 and a lower vessel 48 between which there is connected an absorber pipe coil 47 provided with heat radiating fins 51 for air cooling. It will be noted that the vessel 46 is not equipped with cooling flanges. This vessel is not a heat rejecting part, at least to any substantial degree, and has the function of the vessel 44 of Fig. 1. This vessel takes care of the liquid volume variation and is at higher temperature than the part 47 which is cooled. The stagnant layer is present in this vessel 46 which is separate from the part 47 which is cooled and which is filled with absorption liquid at all times. A conduit 49 extends from the lower absorber vessel 48 upwardly into the upper vessel 46. The lower vessel 48 is provided with a plurality of baffles 50 forming a definite path of flow therethrough for absorption solution. This system also differs from that described in connection with Fig. 1 in that the generator and thermosiphon circulation element are combined and embodied in a pipe coil 59 located in a flue 60 and arranged to be heated by a gas burner 61 below the coil in the lower end of the flue. At the upper end of the combined generator and circulation coil 59 is provided a separating vessel 62 in which the generated vapor and weak solution are separated.

There is provided in this system an analyzer 57 in which generated vapor is bubbled through rich solution flowing from the absorber to the generator. Also in this system there is provided a liquid seal trap arrangement which differs slightly from that described in connection with Fig. 1 but the function of which is the same, as will appear from the description of operation below. In this system, the condenser comprises a pipe coil 53 provided with an extensive heat radiating surface for air cooling formed by heat radiating fins.

This system is also charged with a solution of ammonia in water to a level about at the top of the separator 62 and vessel 46. There is provided an automatic control of the gas burner similar to that described in connection with Fig. 1, the same parts in both figures being indicated by the same reference numerals.

In operation, when the gas burner 61 is lighted at the start of the expulsion period, ammonia vapor is distilled from solution in the generator coil 59 and, rising upwardly, causes flow of solution into the separating vessel 62. In the latter the ammonia vapor rises to the upper part, whence it flows through conduit 65 into the lower part of the analyzer 57. Here it bubbles upwardly through rich solution contained therein. The upward flow of solution in the generator coil 59 creates a circulation of solution between the absorber or cold liquid reservoir and the generator. Rich solution flows from the upper absorption liquid vessel 46 through conduit 54, liquid exchanger 55, and conduit 56 into the analyzer 57. From the latter, solution flows through conduit 58 to the lower end of the heated generator coil 59. From the separating vessel 62, hot weak solution flows through conduit 63, liquid heat exchanger 55, and conduit 64 to the lower absorption liquid vessel 48, thus completing the absorption solution circuit between the generator or vapor expulsion component and the part of the system containing the cold absorption liquid. Due to the provision of the absorber coil 47 and baffle plates 50 in the lower absorption liquid vessel 48, no weak solution reaches the connection of conduit 54 to vessel 46 until substantially all of the solution has become weakened. The generator, separating vessel, analyzer, and liquid heat exchanger are preferably heat insulated, as shown, to reduce to a minimum heat losses due to radiation or otherwise. It will be seen that the flow through the absorber during the vapor expulsion period is unidirectional and undisturbed and that a layer of stagnant liquid can form in vessel 46 which is not broken up by the circulation through the absorber.

From the upper part of the analyzer 57, ammonia vapor continues upwardly through a conduit 66 into an upper trap vessel 67 and thence downwardly through a conduit 68 into a lower trap vessel 69. As shown, conduit 66 is conveniently arranged concentrically within the descending conduit 68 and the latter opens near the bottom of the lower trap chamber 69. Due to condensation in the upper trap vessel 67 and the conduit 68, which are exposed to atmosphere, liquid accumulates in the lower trap vessel 69 sealing off the lower end of conduit 68 so that vapor must bubble through this liquid on the way to the condenser. Excess liquid in the lower trap vessel 69 overflows through a conduit 70 connected to an intermediate point of the vessel and to the lower end of the absorber coil 47.

After bubbling through liquid in the lower part of the trap vessel 69, the vapor flows upwardly through conduit 71 and an air-cooled rectifier 52 to the upper end of the air-cooled condenser 53. Condensate from the rectifier 52 drains into the trap vessel 69 through conduit 71.

Figure 4:
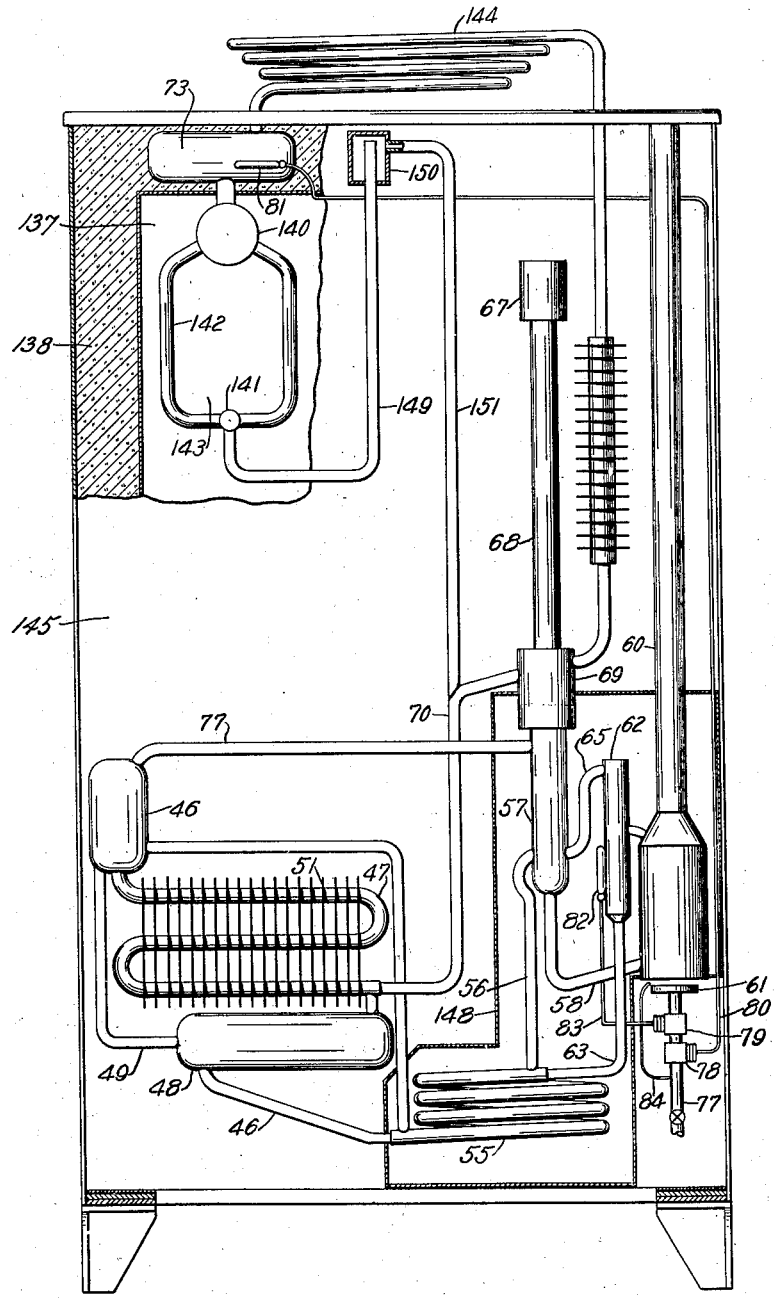
Figure 5:
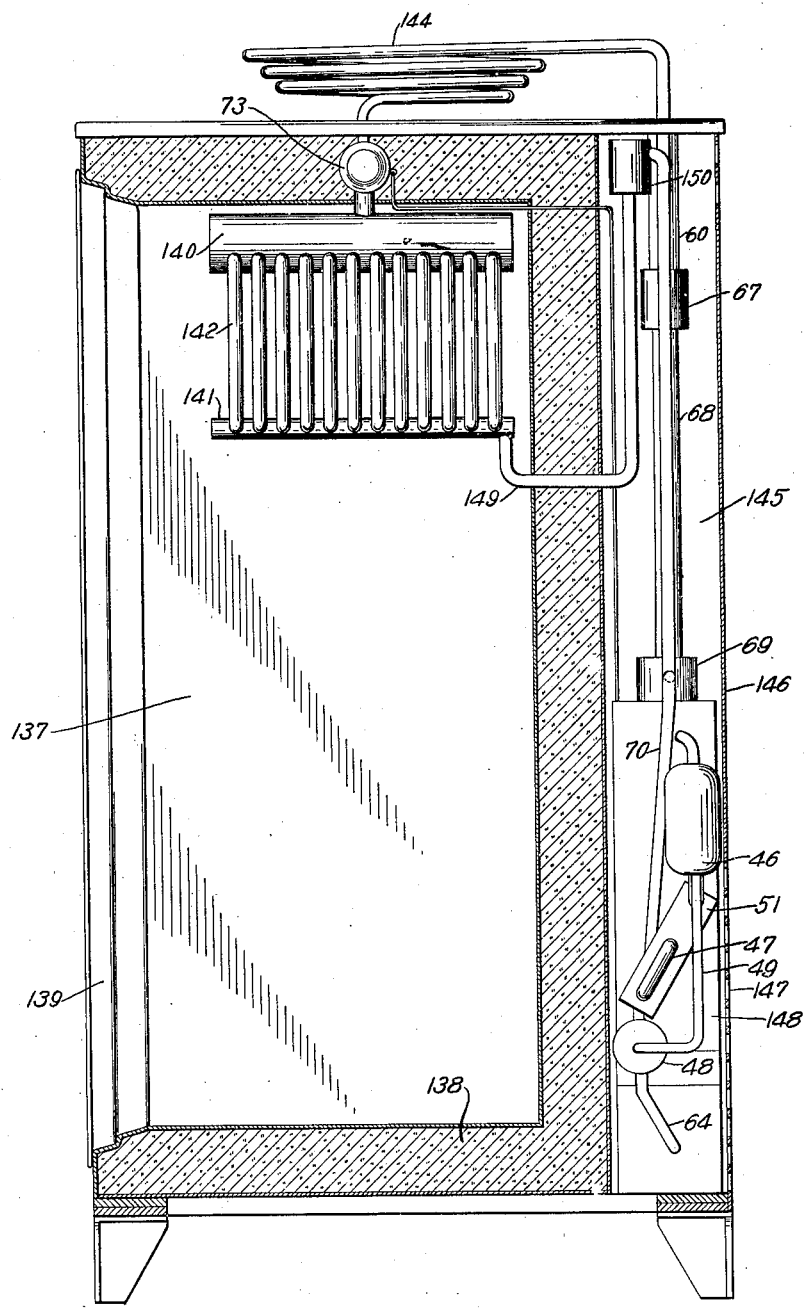

Ammonia vapor is condensed to liquid in the condenser 53 and the liquid drains through conduit 72 into the liquid refrigerant accumulator or reservoir 73 and evaporator 74. The reservoir 73 may be heat insulated as shown in Figs. 4 and 5 where the evaporator reservoir is embedded in the insulation of the refrigerator cabinet in which the unit is mounted. The lower part of the evaporator 74 is connected through a drain conduit 75 provided with a manual valve 76 to conduit 70 for draining water from the evaporator back to the liquid circuit as described in connection with Fig. 1.

When heating of the generator 59 is discontinued by turning off or turning down the gas burner 61, the pressure falls rapidly in the upper trap vessel 67 and conduit 68 due to cooling of the vapor therein and liquid in the lower trap vessel 69 rises into conduit 68 forming a liquid column which balances the pressure drop. The decrease in pressure is communicated to vessel 46 through conduit 77a. As the pressure decreases, the liquid level in conduit 70 falls to the opening at the lower end of this conduit into the lower end of the absorber coil or tube 47. Ammonia vapor from conduit 70 then enters the lower end of the absorber coil 47 where it bubbles upwardly causing an upward flow of solution in this coil. The vapor rising in the absorber coil is absorbed into the cool weak solution. The baffles 50 in the lower absorber vessel 48 assure feeding of weak solution to the lower end of the absorber coil 47.

Liquid ammonia evaporates in the evaporator 74, creating a refrigeration effect, and flows through conduit 72, condenser 53, rectifier 52, conduit 71, lower trap vessel 69, and conduit 70, to the absorber. Upon rise in temperature of the evaporator to a predetermined value, the gas burner 61 is again turned on to instigate the next heating period and the cycle is repeated. Vapor is again generated which raises the pressure in the upper trap vessel 66 whereupon liquid drops down from conduit 68 into the lower vessel 69 and the liquid level rises in conduit 70. The vapor again bubbles through the sealing liquid in the trap and passes to the condenser where it is condensed to liquid which accumulates in the reservoir 73 and evaporator 74.

In this system the sensitive bulb 82 of the thermostatic valve 79 is located in thermal exchange relation with the separating vessel 62 and the bulb 81 of the thermostatic valve 78 is located on the evaporator reservoir 73, the operation being exactly the same as set forth in the description of Fig. 1.

Figure 3:
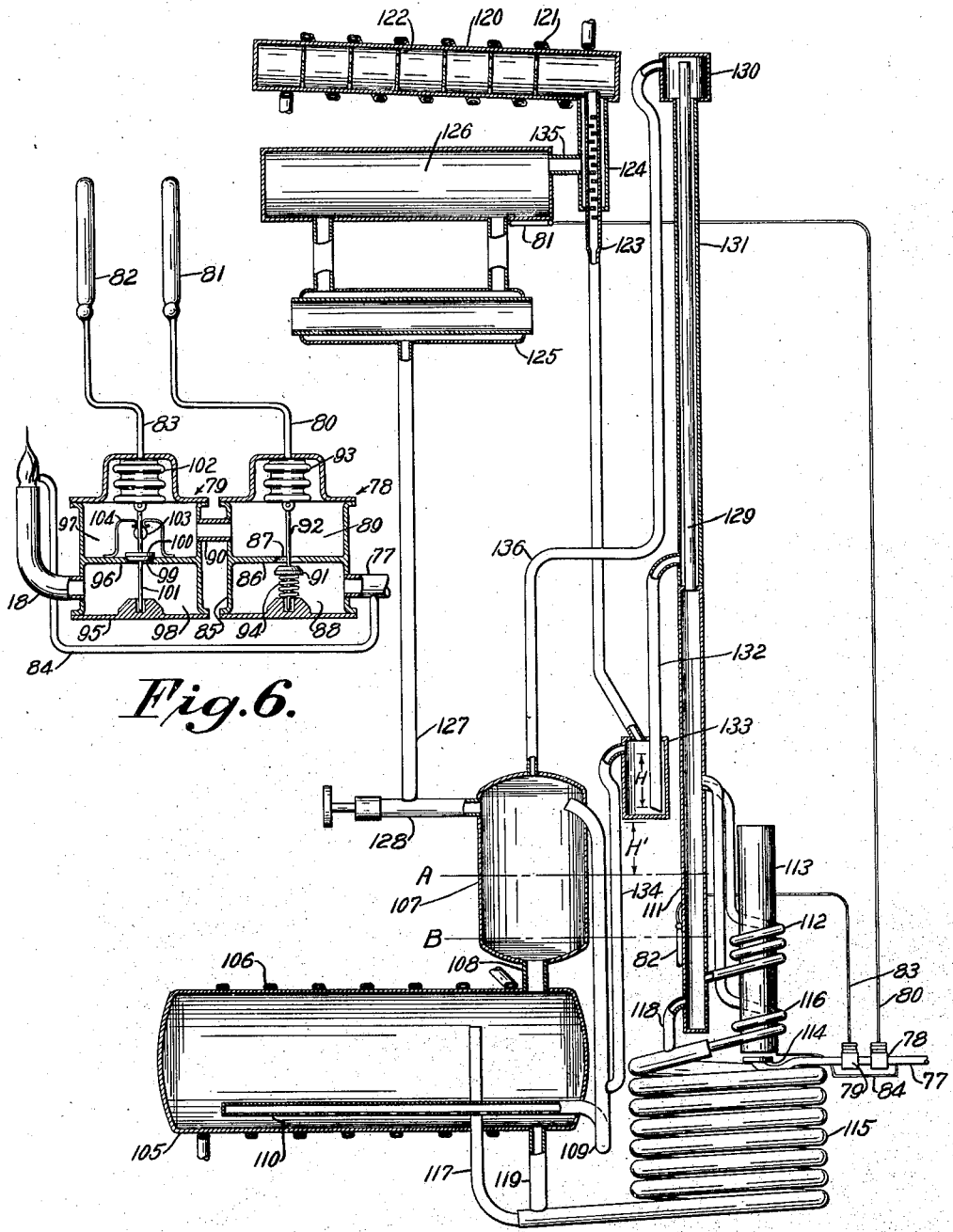

Referring to Fig. 3 of the drawings, there is shown an absorption refrigeration apparatus constructed in accordance with my invention and which operates similarly to the systems above described. However, there are several variations in the apparatus and arrangement thereof as set forth below.

In this system, the main body of absorption liquid is contained in a single vessel 105. It is constructed of a horizontal cylindrical steel shell closed at each end and is provided with a coil 106 around the outside in good thermal conductive relation therewith for circulation of cooling water, though cooling fins may be substituted for the water cooling pipe. Above the absorption liquid reservoir 105 is a volume variation or stagnation vessel 107. The bottom of the vessel 107 is connected to the top of the absorption liquid reservoir 105 by a short narrow conduit 108 so that the vessel 107 constitutes what may be referred to as a standpipe extending upwardly from the body of absorption liquid. The vessel corresponds to the vessel 44 in Fig. 1 and the vessel 46 in Fig. 2. A conduit 109 has one end extending within the reservoir 105 very near the bottom thereof where it is provided with openings 110. The other end of conduit 109 extends upwardly to the upper part of the vessel 107 and the conduit may be formed with a downward loop which extends slightly below the absorber reservoir 105 as shown.

The generator 111 in this system is formed of a comparatively narrow vertical tube and a small diameter pipe coil 112 having its lower end connected to the lower part of the tube and its upper end connected to a higher point on the tube above the liquid level in the latter. The generator tube 112 is coiled about a vertical heating flue 113 adapted to be heated by a gas burner 114 or any other suitable heating element. The only heated portion of the generator is the coil 112. In this generator, the solution is heated in the coil 112 to distill refrigerant vapor which raises solution from the lower part of the tube 111 into the upper part of the tube above the liquid level therein by the vapor lift principle previously referred to, the vapor being separated from the liquid at the upper connection of coil 112 to the tube 111.

In this system the liquid heat exchanger 115 is of the coiled concentric tube type previously described in connection with Figs. 1 and 2. There is also provided a thermosiphon circulation tube 116 as described in connection with Fig. 1 having its lower portion coiled about the heating flue 113 and its upper end connected to the generator tube 111 above the liquid level therein.

This system may also be charged with a water solution of ammonia to an initial level A. During the heating or expulsion period, rich solution flows in the form of a small stream from the cold absorption liquid reservoir 105 through a conduit 117, liquid heat exchanger 115, and the thermosiphon 116 into the generator tube 111 above the liquid level therein where the vapor formed in the thermosiphon is separated from the raised solution, which latter descends into the lower part of the generator. From the lower part of the generator tube 111, weak absorption solution returns through conduit 118, liquid heat exchanger 115, and conduit 119 to the bottom of the absorber-reservoir 105. During this period, solution from the generator tube 111 is being circulated through the generator heating coil 112 where vapor is expelled from solution as previously described. It has been found that due to the difference in specific gravity of the weak and strong solution stratification is very distinct in the reservoir 105. For this reason conduit 117 should be extended to very near the top of the reservoir 105 where the strong solution stratum occurs and conduit 119 is connected to the bottom of the reservoir 105 so that the stratum of returned weak solution increases upwardly during the heating period and no weak solution reaches the opening of conduit 117 until substantially all of the solution in the absorber has become weakened. Although not shown in Fig. 3, the lower part of the generator tube 111, generator coil 112, thermosiphon coil 116, and the heat exchanger 115 are preferably enclosed with thermal insulating material preferably of a character having minimum heat storage capacity. This is for the purpose of preventing heat loss by radiation or otherwise as set forth in connection with the systems shown in Figs. 1 and 2 where the insulation is illustrated.

The condenser 120 comprises a closed tube having a slightly downward slant and provided with a circulating coil 121 for cooling water. The interior of the condenser tube is provided with a plurality of perforated baffles 122 which are arranged so as not to obstruct drainage of condensate. Vapor is admitted to the condenser at its lower end through a conduit 123 and liquid drains from the condenser also at the lower end into a sump 124 which forms a jacket around the upper end of the vapor conduit 123. The portion of conduit 123 extending upwardly through the jacket 124 therefore forms a liquid cooled rectifier chamber in which water vapor is condensed out of the ammonia and drains back through conduit 123 to the liquid circuit.

The evaporator 125 and reservoir 126 are generally similar to those previously described, it being understood that the types of evaporator and reservoir are not critical but may be of any type adapted to accumulate liquid refrigerant from the condenser during the expulsion period and provide suitable evaporator heat transfer surface during the absorption or refrigeration period. The bottom of the evaporator 125 is connected to the upper part of the volume variation vessel 107 through conduit 127 provided with a normally closed drain valve 128 as previously described. It is understood, however, that any suitable arrangement for draining water from the evaporator back to the liquid circuit may be employed such as the automatic overflow illustrated in Figs. 4 and 5.

Between the vapor space of the generator and the condenser is a liquid trap arrangement which functions similarly to those described in connection with the systems shown in Figs. 1 and 2. From the upper end of the generator 111, a conduit 129 extends vertically into the upper part of a vessel 130. From the bottom of the latter there extends downwardly concentrically around conduit 129 a larger conduit 131 which is closed at its lower end and forms an annular space around conduit 129 communicating with the bottom of vessel 130. As shown, the conduit 131 is conveniently arranged directly above the generator tube 111 forming, in effect, a continuation thereof but without communication therebetween. From the lower part of conduit 131 a small conduit 132 extends downwardly and terminates with an opening at the bottom of a lower trap vessel 133. This vessel is located entirely above the liquid level of solution. From the top of the trap vessel 133 the previously described conduit 123 is connected to the condenser and also from the upper part of vessel 133 a conduit 134 extends downwardly and is connected to the lower part of the conduit 109 just above the loop previously described.

The control valve arrangement for the gas burner 114 as shown is similar to that described in connection with Fig. 1, the same parts being indicated by the same reference numerals in both figures. In this system, the bulb 81 of the thermostatic valve 78 is located on the evaporator reservoir 126 and the bulb 82 of the thermostatic valve 79 is located on the generator tube 111. It is obvious that any suitable heating means may be used and any suitable control for the heating means may be employed which functions to perform the results herein set forth.

As previously mentioned, the system is charged through a suitable valve or charging plug preferably on the volume variation vessel 107 with a water solution of ammonia with an ammonia concentration of approximately 35%. The solution is charged to an initial level A which should not be above the lower end of conduit 132 in the trap vessel 133 and is preferably considerably below this level for a reason which will hereinafter appear. When the system is first put into operation, both gas valves 78 and 79 will be open since the parts are all at substantially room temperature. By opening the usual gas line cut-off valve, not shown, the burner 114 and pilot 84 may be lighted, thus applying heat through the flue 113 to the thermosiphon coil 116 and generator coil 112. Distillation of ammonia vapor and circulation of absorption solution between the generator and reservoir 105 now occur as previously described. Upon putting the system into operation, water is also turned on for circulation through the absorption liquid and condenser cooling coils 106 and 121 respectively, these coils being connected either in series or parallel but preferably in series, with the water circulating first around the absorber and then around the condenser. As previously explained, no control of water circulation is necessary since cooling of the vessel 105 is preferably continuous. It will be understood, however, that the cooling medium may be regulated and that continuous cooling is not necessary to the invention. The invention makes it possible to avoid regulation of the cooling, which is a great practical advantage, particularly with air-cooled apparatuses.

Vapor from the upper part of the generator tube 111 flows upwardly through conduit 129 into vessel 130 and thence downwardly through the outer conduit 131 and conduit 132. In the same manner as described in connection with Figs. 1 and 2, liquid formed by condensation in vessel 130 and conduit 131 drains downwardly into a lower vessel 133 sealing off the lower end of conduit 132. Condensate from the rectifier also drains through conduit 123 into the lower vessel 133. Excess liquid overflows through conduit 134 back to the liquid circuit. Vapor from conduit 132 bubbles upwardly through the liquid in vessel 133 against the liquid column head indicated as H which is the height of liquid in vessel 133 above the lower end of conduit 132. From the upper part of vessel 133, vapor flows through conduit 123 and rectifier 124 into the condenser 120. Liquid ammonia from the condenser drains into the rectifier jacket 124 from where it overflows through conduit 135 into the reservoir 126 and evaporator 125.

The upper part of the vessel 107 is connected through conduit 136 to the upper part of vessel 130. At the beginning of the heating period, vapor flowing through conduit 136 will be absorbed in liquid standing in the vessel 107 forming a very highly concentrated surface layer of solution which, being relatively stagnant, prevents further absorption. If the temperature in vessel 107 is higher than in the condenser which is obviously the case in the water cooled system illustrated, condensation of vapor will not occur in the vessel 107. In some systems embodying my invention it may be found preferable to maintain the vessel 107 at a slightly higher temperature to prevent condensation as previously explained.

Due to the liquid head H in the trap vessel 133 there is a corresponding pressure difference exerted on the solution in conduit 134 wherefore there stands in this conduit a corresponding liquid column indicated as H'. The reason for charging the system with a solution to a level below the lower opening of conduit 132 will now be understood. If the solution should be charged to a higher level, the column H will be higher than the head available for forming the balancing column. It will be clear that if the column H' must rise so that liquid overflows into vessel 133, the result will be to merely increase the liquid column H which will require a still greater column H' so that liquid will rise in conduit 123 and the evaporator be flooded with solution. Then not until so much solution has been discharged into the evaporator that the solution liquid level falls below the lower end of conduit 132 will the columns H and H' become balanced.

Upon continued distillation of ammonia vapor during the expulsion period, the solution weakens and the generator temperature rises. Also, due to the ammonia distillation, the solution recedes to a lower level B. Assuming that at this level the generator temperature rises to a value of 150° C. (302° F.) the thermostatic valve 79 will snap closed turning off the burner to instigate the absorption period.

After distillation in the generator has ceased, there will occur on the liquid surface in the generator and on the walls of the generator and conduit 129 a slight absorption of vapor due to the lowering of temperature since these parts are not insulated but cooled by the atmosphere. This causes a small pressure drop whereby the pressure in the evaporator, condenser, and conduit 123 will be slightly higher than in the generator and vessel 107. The sealing liquid in vessel 133 rises into conduit 132 while the level of liquid in conduit 134 decreases. When the liquid level in conduit 134 recedes to the opening of this conduit into conduit 109 vapor bubbles into the latter causing an upward flow of weak solution into which the vapor is absorbed as previously explained. The introduction of liquid above the level in the vessel 107 breaks the surface film previously referred to whereupon the pressure in the gas space, including the gas space in conduits 136, 129 and in the generator member 111 decreases still further. Since the gas space in vessel 107 is in gas communication with the generator gas space through conduits 136 and 129, vapor will be drawn from the generator and absorbed in the liquid in vessel 107. The height of solution above the lower opening of conduit 134 is balanced by a corresponding liquid column in conduit 132. Thus I have provided means utilizing flow of refrigerant within the system and independent of application of external cooling for lowering pressure in the generator by absorption of refrigerant at the beginning of absorption periods.

If upon turning off or diminishing the heat the pressure drop is very rapid, liquid will spurt up through conduit 132 into the annular space in conduit 131 which tends to break the siphoning action. However, if liquid should flow through conduit 131 into the vessel 130 it is retained therein and can drain back to reform the liquid column seal.

Fig. 3 is a drawing to scale of a refrigeration apparatus constructed as described above. The apparatus was charged to the level A with a water solution of ammonia of approximately 35% ammonia concentration. The generator, liquid heat exchanger, and heated coils were suitably insulated with felt and aluminum foil to reduce heat loss by radiation. Instead of the gas burner 114 there was provided a 400 watt electric heating element inserted in the lower end of the heating flue 113 as per se well known in the art. This heating element was turned on and off by hand in order to retain flexibility of operation for test purposes. It will be understood, however, that any type of heating means and control therefore may be employed as disclosed above. The absorption liquid cooling coil 106 and condenser cooling coil 121 were connected together and water from the city supply continuously circulated therethrough respectively in series.

Upon turning on the heat, distillation of ammonia began almost immediately. This heating period was continued for one hour after which the heat was shut off. The cooling water had an inlet temperature of approximately 15° C. (59° F.) and was continuously circulated at the rate of approximately 10 liters (2.64 gallons) per hour. After the heat was turned off at the end of the heating period, absorption began after an interval of approximately ten minutes. After thirty minutes the evaporator temperature had fallen to approximately −12° C. (10.4° F). and thereafter continued to decrease to approximately −31° C. (−23.8° F.). The evaporator and reservoir were not insulated. This apparatus was also operated with a heating period of one hour but with a circulation of cooling water at the rate of approximately 100 liters (26.4 gallons) per hour at an inlet temperature of approximately 8° C. (46.4° F.). Within fifteen minutes after turning off the heat at the end of the heating period the evaporator temperature had fallen to 0° C. (32° F.). Within thirty minutes after turning off the heat the evaporator temperature had fallen to approximately −33° C. (−27.4° F.) and continued to decrease to approximately −38° C. (−36.4° F.). The apparatus was also operated under these conditions with the evaporator reservoir 126 thermally insulated which resulted in lengthening of the cooling period as would naturally be expected.

Referring to Figs. 4 and 5 of the drawings there is illustrated a refrigeration apparatus in accordance with my invention mounted in a refrigerator cabinet. The system is similar to that described in connection with Fig. 2 except for several slight modifications hereinafter described. Similar parts of the apparatus in Figs. 2, 4, and 5 are indicated by similar reference characters.

The refrigerator cabinet may be of any suitable construction having a food storage compartment 137 enclosed by thermally insulated walls 138 and accessible by a thermally insulated door 139. In the upper part of the storage compartment 137 is located the evaporator comprising an upper header or manifold 140 and a small lower manifold 141 between which are connected a plurality of tubes 142 enclosing a freezing chamber 143 which may be provided with shelves or other suitable supports for reception of trays containing water or other substance to be frozen. The evaporator is located in the upper part of the storage compartment for most advantageous cooling of the air therein by natural circulation since the warmest air rises to the top of the compartment. The evaporator header 140 is connected to the reservoir 73 which is embedded in the insulation of the top wall of the refrigerator. This arrangement of the reservoir is merely by way of example and the reservoir may be insulated in any other known manner.

The condenser 144 is in the form of a pipe coil on the top of the refrigerator and obviously may be provided with heat radiating fins, not shown, or the like for transfer of heat to the atmosphere or may be otherwise located and cooled in any suitable manner. The remaining parts of the apparatus are located in a shallow space or flue 145 in the rear of the refrigerator. The upper absorption liquid vessel 46 and lower absorption liquid vessel 48 are offset with the absorber coil 47 connected at a slight angle therebetween and the rear wall 146 of the refrigerator is provided with a plurality of air inlet openings 147 opposite the absorber coil for circulation of air upwardly by natural draft over the coil and fins 51. The thermal insulating material around the high temperature portions of the apparatus is held in place by a casing 148. In Fig. 4 this casing is shown but the insulation material is omitted for clarity of illustration. The generator heating flue 60 is extended upwardly to the top of the refrigerator and may be provided with a suitable air intake, not shown, for dilution and cooling of the flue gases as well known in the art.

For returning water from the evaporator to the solution circuit there is provided a liquid trap overflow comprising a conduit 149 looped slightly below the evaporator with one end connected to the small lower manifold 141 and the other end extending upwardly into a vessel 150 located at approximately the same level as the reservoir 73. An overflow conduit 151 is connected at its upper end to the vessel 150 at the upper level of liquid in the evaporator reservoir 73 and is connected at its lower end to conduit 70. Unevaporated liquid remaining in the evaporator at the end of the absorption period is of greater specific weight than the condensed ammonia and descends to the bottom of the evaporator and into conduit 149. During the next heating period it is raised, due to the increasing column of condensed ammonia in the evaporator, through conduit 149 into the vessel 150 from where it overflows toward the end of the heating period through conduit 151 back to the absorber. It will be understood, however, that any known type of automatic drain may be employed.

Figure 7:
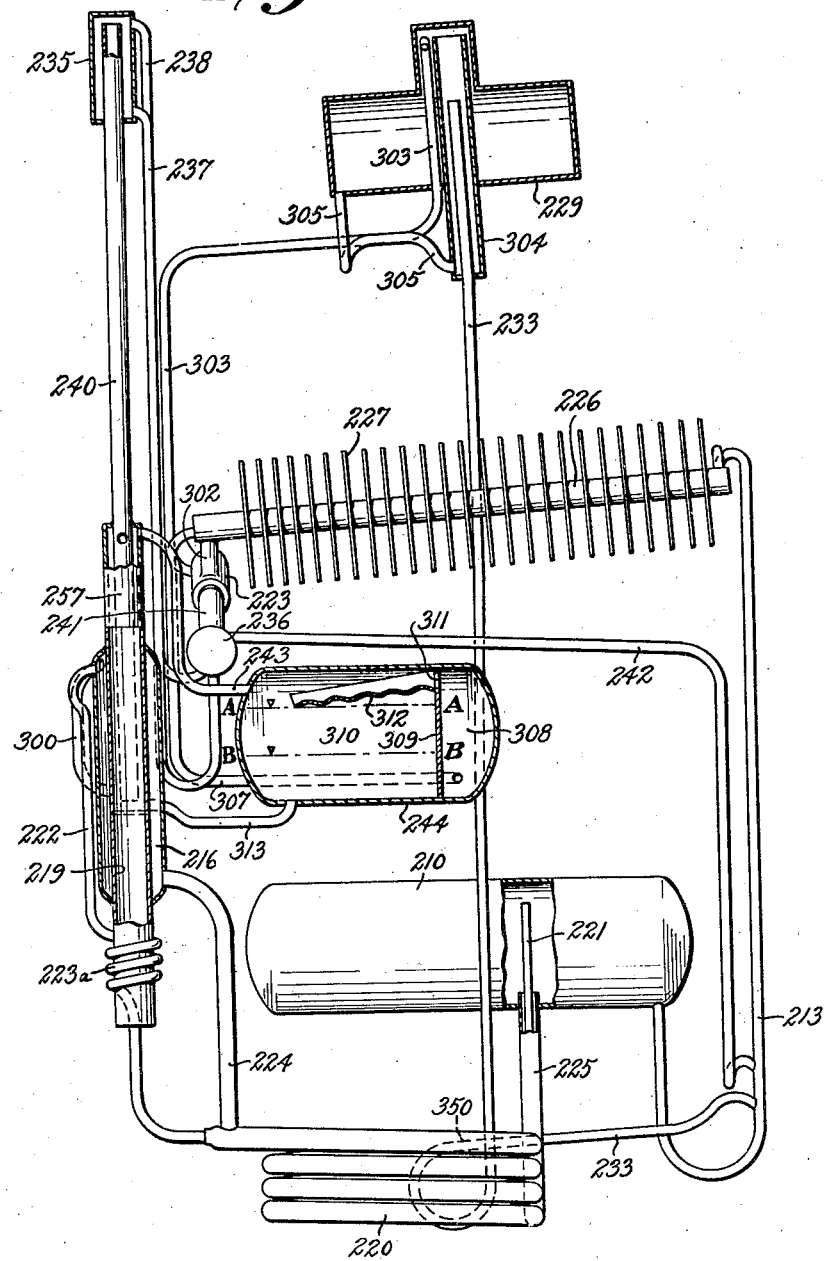
Fig. 7 is an elevational view of another apparatus embodying my invention.
Figure 8:
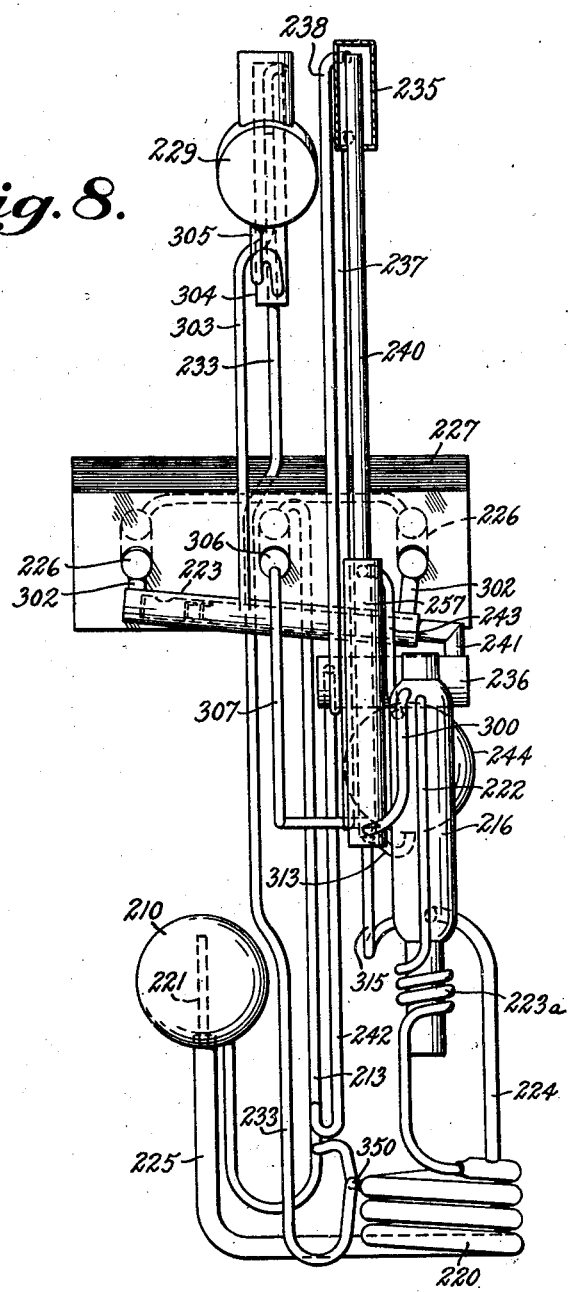
Fig. 8 is another elevational view of the apparatus shown in Fig. 7.
Figure 9:
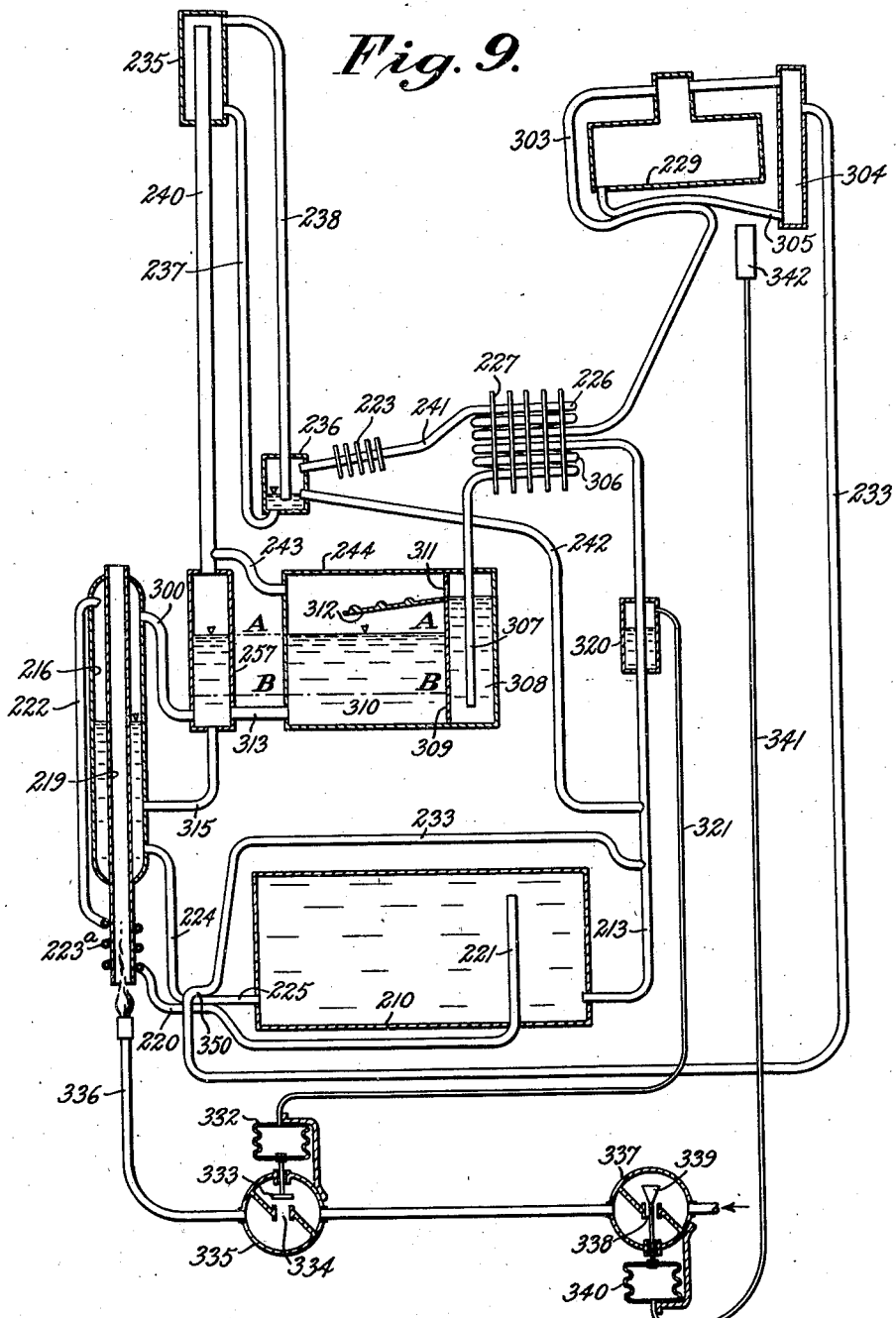
Fig. 9 is a schematic view of the apparatus shown in Figs. 7 and 8.

In Figs. 7, 8 and 9 I have illustrated another embodiment of the invention. Fig. 9 is a simplified diagrammatic view of the physical apparatus shown in Figs. 7 and 8. The system here disclosed includes a boiler or generator 216. The generator is heated by means such as a gas flame projecting its heat into the flue 219. From the upper part of the generator a conduit 300 leads downwardly to the lower part of the analyzer vessel 257. A conduit 260 connects the upper part of the vessel 257 with the upper part of vessel 235. The vessel 235 is connected to a trap vessel 236 located at a lower level. This connection may be made in a manner similar to that previously disclosed. For example, the conduits 237 and 238 connect the vessels 235 and 236 in the same manner as conduits 37 and 38 in Fig. 1 connect the vessels 35 and 36. A conduit 241 connects vessel 236 with the condenser 226. Interposed in the conduit 241 is a rectifier 223 indicated diagrammatically in Fig. 9 by air-cooled fins on the portion of the conduit 241 leading backwardly and downwardly towards the vessel 236.

In the actual device shown in Figs. 7 and 8, the rectifier comprises a jacket 223 which is connected with the condenser tubes 226 by means of conduits 302. The rectifier jacket encloses a tube containing baffles, which is open at the upper end to form a vapor connection between the space inside the inner tube and the jacket. The jacket is closed at the lower end so as to retain a pool of liquid outside the inner tube which cools the inner tube by vaporization of refrigerant, thus providing rectification. The outer space of the rectifier is supplied with liquid by drainage from the condenser tubes 226. Vapor can pass upwardly through tubes 302 into the condenser tubes. The condenser is air-cooled by means of flanges 227. Referring to Fig. 8, it will be seen that these flanges cool the condenser tubes 226 and an intermediate tube 306 which is a part of the absorption liquid portion of the system hereinafter described.

Liquid condensing in the condenser flows through conduit 303 and into the upper part of the evaporator 229. The evaporator consists of a hollow vessel and may be provided with a dome as illustrated. The liquid supply pipe 303 opens within the dome of the evaporator. Within the evaporator and extending downwardly therebelow is a tube 304, open at the top and closed at the bottom. A pipe 305 connects the bottom of the evaporator, preferably at the lowest point thereof, with the lower part of the tube 304. This pipe 305 has an upward bend adapted to trap gas therein. The pipe 305 is in heat exchange relation with the condensate pipe 303. Pipe 305 may be in heat transfer relation with another warm pipe of the system, for example pipe 238. A pipe 233 has an opening into the tube 304 at a high level of the evaporator. As shown in Figs. 7 and 8 this pipe may extend downwardly through the tube 304. The pipe 233 continues downwardly and, as shown at 350, is in heat exchange relation with a relatively warm part of the heat exchanger 220 which exchanges heat between liquid flowing to the generator and liquid flowing from the generator. The pipe 233 continues from this point to and is connected with a pipe 213, which pipe 213 connects the lower part of the absorption liquid reservoir 210 with the absorber cooling element 306. The absorber cooling element is connected by means of a conduit 307 with the interior of the chamber 308 within a vessel 244. The absorber cooling element 306 is embedded in the same cooling flanges 227 as the condenser element or elements 226.

Within vessel 244 is a partition 309 separating the chamber 308 from the chamber 310. Communication is afforded between these chambers at the upper part of the vessel 244 through an opening 311 in partition 309. Just below this opening and in chamber 310 is a trough or baffle 312, which is inclined downwardly and over which liquid may flow from chamber 308 to chamber 310. Vessel 244 is connected at its lower part to the lower part of analyzer vessel 257 by means of a pipe 313. The upper part of vessel 244 is connected to conduit 240 by a pipe 243. A pipe 242 is connected to vessel 236 and to pipe 213 preferably above the connection of pipe 233 therewith. The generator vessel 216 and the absorption liquid reservoir 210 are connected by a thermosiphon circulation system similar to that previously explained. The conduit 224, 225 connects the lower part of the vessel 210 with the lower part of the generator. The conduit 221 extends from the upper part of the reservoir 210 in heat exchange relation with the pipe 224, 225 to form the heat exchanger 220 and thence is wound around the heating flue 219 to form a thermosiphon element 223a and then extends, as conduit 222, upwardly to the upper part of the generator. The vessel 257 is connected at its lower part to the lower part of the generator by means of a conduit 315. The hot parts of the apparatus are insulated in the usual manner.

The apparatus is filled to approximately the level A—A with a refrigerant solution, preferably an ammonia solution. The apparatus contains no other gas than that of ammonia. The apparatus may be filled by means of a suitable filling plug or valve connected to the vessel 210.

The operation of this apparatus is as follows:—

We may assume that the apparatus is being started for the first time or that we are at the end of an absorption period. The application of heat to the flue 219 causes expulsion of refrigerant vapor from solution. Assuming that the refrigerant is ammonia and the absorption liquid is water (although other refrigerants and absorption liquids may be used), ammonia vapor will be generated. In addition to the ammonia and water, the system preferably contains between 1 and 2% of sodium chromate relative to the weight of water in order to prevent formation of foreign gases. The ammonia vapor passes through the conduit 300 into the analyzer vessel 257 and bubbles through the liquid therein. From this vessel the gas pases upwardly through conduit 240 and into vessel 235. Thence the ammonia vapor passes through conduit 238 and bubbles through the liquid in vessel 236. The gas thence passes through conduit 241 and rectifier 223 and into condenser tubes 226 where it is condensed to liquid. Liquid condensed in the condenser tubes 226 flows downwardly into the rectifier jacket 223 and causes condensation of water vapor in the inner tube within jacket 223, which water flows backwardly to the vessel 236. The level of conduit 242 determines the height of liquid in vessel 236 and excess liquid overflows into conduit 242. Liquid from the condenser tubes 226 flows through conduit 303 into the evaporator. Liquid accumulates in the evaporator and in the tube 304.

Simultaneously, liquid is circulated between reservoir 210 and the generator 216. Liquid leaves the reservoir 210 by way of conduit 221 and enters the thermosiphon element 223a where gas bubbles are formed, and the mixture of gas and liquid flows upwardly through conduit 222 into the upper part of the generator. The higher level in the generator causes flow of liquid by gravity back to the reservoir 210 through conduit 224, 225. Heat is transferred from the warm solution passing through conduit 224 to the strong solution pasing through conduit 221. Thus the weak solution in conduit 224, 225 is cooled and conducted to and accumulated in reservoir 210 to await the absorption period. During this period, the liquid in conduit 213 and absorber element 306 and conduit 307 and chamber 308 is stagnant. Thus the absorber element 306 is directly exposed to the influence of the external cooling medium, in this case air, although water may be used instead, but the external medium is ineffective to cool the entire body of absorption liquid due to the stagnant condition of the liquid in absorber element 306. The liquid contained in conduit 213 and absorber element 306 and conduit 307 remains at low temperature relative to the temperature of generator. Due to the heat exchanger 220, the liquid within vessel 210 will not be materially heated, and will remain relatively cold. This vessel may be and preferably is surrounded by air and thus may be air-cooled, although this method of cooling is not necessary.

Assume now that the expulsion period has continued so far that liquid has accumulated in the tube 304 to the point of overflowing into conduit 233. After the apparatus has been in operation for one or more cycles, there will be an accumulation of absorption liquid in the lower part of the evaporator. As liquid ammonia fills the evaporator, the absorption liquid is forced out through conduit 305 and enters tube 304. Thus this absorption liquid is the first to overflow into the pipe 233, and thus this pipe 233 serves as an automatic return to conduct absorption liquid back to the proper place in the system from the evaporator. The heating of the pipe 305 by the conduit 303 or by the conduit 238 or other warm part keeps trap pipe 305 heated close to the boiling point of the pure refrigerant, so that upon any reduction of pressure in connection with the starting of the absorption period, formation of gas will occur in the trap, thus preventing a quick flow or surging of liquid refrigerant from the evaporator. Furthermore such gas permits a maximum rise of ammonia liquid in the evaporator before overflow into tube 233 takes place. The overflow of water into tube 233 will not have any effect on the operation of the system. When, however, an appreciable amount of relatively pure ammonia has flowed into tube 233 and is heated by the heat exchange relation of this conduit with heat exchanger 220, then vapor bubbles will form in the upwardly extending part of conduit 233 which is in heat exchange relation with the heat exchanger 220. The bubbles thus formed will rise and enter into conduit 213. This will start an upward bubbling of liquid in conduit 213 and this is the signal that the expulsion period is finished. The entrance of ammonia vapor into conduit 213 results in absorption thereof. The heat of absorption is rejected, whereby the conduit 213 is raised in temperature. This heating of conduit 213 may be utilized as an impulse for controlling the cutting out or diminishing of the gas supply to stop vapor expulsion in the generator.

During this expulsion period which has taken place at high pressure, for example 300 lbs. per square inch, the liquid level in chamber 310 has dropped to a lower level, for example B—B. The liquid flowing to the generator from the vessel 310 passes in direct gas and liquid contact with vapor leaving the generator, whereby this liquid is preheated before entering the generator and the gas leaving the generator is deprived of water vapor.

We have now finished the expulsion period and the absorption period begins. It will be understood that the absorption period takes place at a low pressure relative to the expulsion period.

Upon the diminishing of the heat or the cutting out of the heat so that vapor is no longer formed in the generator, the high temperature parts will cool down. The pressure thus falls throughout the apparatus since all parts are in open communication. Some absorption takes place in the generator, and in the vessels 257, 235 and 244. The lowering of pressure in the gas containing spaces causes a change of the liquid column status in the system. The pressure in the evaporator does not fall as rapidly as the pressure in the heated parts and consequently liquid columns are built up in conduits 237 and 238, and liquid columns which had been built up during the expulsion period in conduits 233 and 242 decrease correspondingly. When the liquid in conduit 242 lowers to the point of connection with conduit 213, gas passes from the evaporator through the condenser and rectifier and through conduit 242 and into conduit 213. Evaporation is now taking place in the evaporator to produce refrigeration. The supply of gaseous ammonia into conduit 213 causes upward flow therein and a siphon flow is established through the liquid circuit, the flow being upwardly in conduit 213, through the cooled absorber element 306, downwardly in conduit 307, into chamber 308, through opening 311 and downwardly over baffle 312 into chamber 310, through conduit 313, through vessel 257, through conduit 315, through generator 216, through conduit 224, 225, through absorption liquid reservoir 210 and back into conduit 213. This is now set up as a continuous circulation due to the gas lift action resulting from the introduction of ammonia gas into conduit 213. The ammonia is absorbed in the absorption liquid and heat is given up. This rejection of heat takes place to the surrounding atmosphere through the fins 227 which are mounted on the absorber element 306. The flow of absorption liquid continues, and further absorption takes place on the baffle 312. The liquid entering chamber 310 from chamber 308 is relatively cold and is capable of absorbing more ammonia. This liquid flowing over baffles 312 is capable of absorbing the relatively small amount of ammonia gas contained in chamber 310 and the previously heated parts which are in gas communication with chamber 310. This absorption hastens the decrease of pressure in the previously heated parts and thereby hastens the lowering of pressure in the evaporator so that the temperature drops rapidly and evaporation takes place at low temperature to produce refrigeration very quickly after the absorption liquid circulation is started due to the introduction of ammonia vapor into conduit 213. The absorption continues and the liquid contained in vessel 210 and the aforementioned liquid circulation conduits and vessels becomes more and more concentrated with ammonia. The temperature is adequately kept down by the rejection of heat to the atmosphere by the absorber cooling element 306, which may be aided and preferably is aided by the exposure of reservoir 210 to atmospheric cooling.

The evaporator drops rapidly in temperature and may continue at a low relatively even temperature for a certain period and then will slowly rise in temperature. During this time the ammonia is being removed from the evaporator by evaporation. Various ways may be employed to close the absorption period and restart the heating period. The rise of temperature of the evaporator itself may be used to cause this cycle change. Another signal which may be employed for cycle change is the temperature of conduit 213, in which case the evaporator will be discharged to what might be termed relatively dry condition. The entering of ammonia gas into conduit 213, as above stated, has heated this conduit and when no further gas enters this conduit, and if the conduit is exposed to external cooling influence, such as the atmosphere, it will be cooled down again and this cooling can be utilized as a signal to stop the absorption period and again start the heating period. Upon starting of the heating period the pressure will rise in the generator again and the liquid column status will be changed. Thereupon the cycle operation will repeat as previously described.

Since the evaporator vessel 229 is heated during the expulsion period to the temperature approximately corresponding to the condensation temperature during such period, it is preferable not to expose it directly to the space to be cooled. In order to avoid such undue heating of the space to be cooled, the evaporator may be equipped with a number of loops connected to the bottom of vessel 229, said loops extending into the space to be cooled, or the evaporator may be provided with an indirect heat transfer system projecting into the space to be cooled. Such system contains a separate volatile liquid as known in the art and as shown in U. S. Patent No. 1,798,951, granted on March 31st, 1931, or U. S. Patent No. 1,711,804, granted May 7th, 1929 (reissue Patent No. 18,665 of November 22, 1932).

The apparatus shown in Figs. 7, 8 and 9 may be regulated in the same manner as described in connection with Fig. 1. On the other hand, it is possible to use a different mode of regulation and I propose to do that by means of an arrangement diagrammatically illustrated in Fig. 9. A jacket 320 containing a volatile fluid is in heat exchange relation with conduit 213 above the connection of conduit 242 therewith. This jacket is connected by means of the tube 321 with a bellows 322. The bellows is expansible and operates the valve member 333 adapted to open and close the opening 334 in a valve structure 335 mounted in the gas supply line 336. In series with the valve 335 is a valve 337 having an opening 338 controlled by a gradually opening and closing valve 339 which is actuated by the bellows 340. The bellows 340 is connected by means of a tube 341 with a thermostat bulb 342 situated within the space to be cooled. The bulb 342 likewise contains a volatile liquid.

When the conduit 213 becomes warm due to the entrance and absorption of ammonia vapor, the fluid in jacket 320 expands and pressure is exerted within bellows 332 causing the same to expand and close valve 333. Then the absorption period starts as previously described. When the conduit 213 becomes cold at the end of the absorption period, the valve 335 is opened again to allow gas to be admitted to the burner. If at this time the temperature of the space to be cooled is low, the valve bulb 342 is cold and the fluid contained in this bulb and the conduit 341 and the bellows 340 is contracted. Therefore, the opening through valve 337 is restricted and may even be closed. This slows up the generation of ammonia vapor and the expulsion period is thus prolonged in accordance with the low temperature of the space to be cooled. If, on the other hand, the space to be cooled is at a relatively high temperature, the valve 337 will be wide open and thus the expulsion period is shortened to as fast a period as is permitted by the apparatus. Thus this control both regulates the cycle operation and serves to maintain the desired temperature of the space to be cooled within predetermined limits.

From the foregoing it will appear that the last described system has the same principal characteristics as those previously described. The system is of the periodic operating type operating with low pressure periods of refrigerant evaporation and absorption alternating with higher pressure periods of vapor expulsion without evaporation. During the expulsion period, the ammonia flows from the absorption liquid containing portion of the system to the evaporator and accumulates therein and does not flow back. During the absorption period, vapor passes from the evaporator to the absorption liquid portion of the system but does not flow and is incapable of flowing towards the evaporator. The same liquid seals and columns are built up and maintained as in the previously described systems which cause this one way flow during the different periods in what might be considered as an opposite direction. The volume variation of the absorption liquid of the system is taken care of in the chamber 310 and somewhat in the analyzer vessel 257 which spaces are not equipped with means for external withdrawing of heat and which are insulated from the absorption liquid circulation circuit during expulsion periods. The main body of absorption liquid is contained in the reservoir 210 which is free of gas environment. In other words, the vessel 210 is at all times filled with liquid, and although there may be gas within the liquid, there is no gas surface adjacent to the liquid body within the vessel, there being no free liquid surface within this vessel. The generator is thermally insulated from the vessel 210. Circulation takes place between the generator and the reservoir 210 during the expulsion period but although the absorption liquid portion of the system is directly subject to the influence of the external cooling medium, this external cooling medium is ineffective to detract from the generation of ammonia vapor and carrying of the ammonia to the evaporator. The absorption liquid is maintained in cold condition during the expulsion period except for the small part or body which is being heated to expel the ammonia vapor. The heat applied to raise the temperature of the liquid, as such, during the expulsion period is to a great extent recovered by means of the liquid heat exchanger and transferred into the liquid flowing to the generator, so that the liquid entering the vessel 210 is maintained relatively cold. As soon as the ammonia is expelled from a part of the solution, the weakened solution is cooled and returned to storage in reservoir 210. Thus the greater portion of the absorption liquid during the expulsion period is maintained in cold condition and under the condensation temperature. The gas space of the generator has a pressure communication with the cold part of the absorption liquid portion of the system but does not have a gas communication therewith. This communication is through the vessel 244 in which the liquid volume differential is taken care of, and the connection is beneath the surface of liquid therein.

Figure 10:
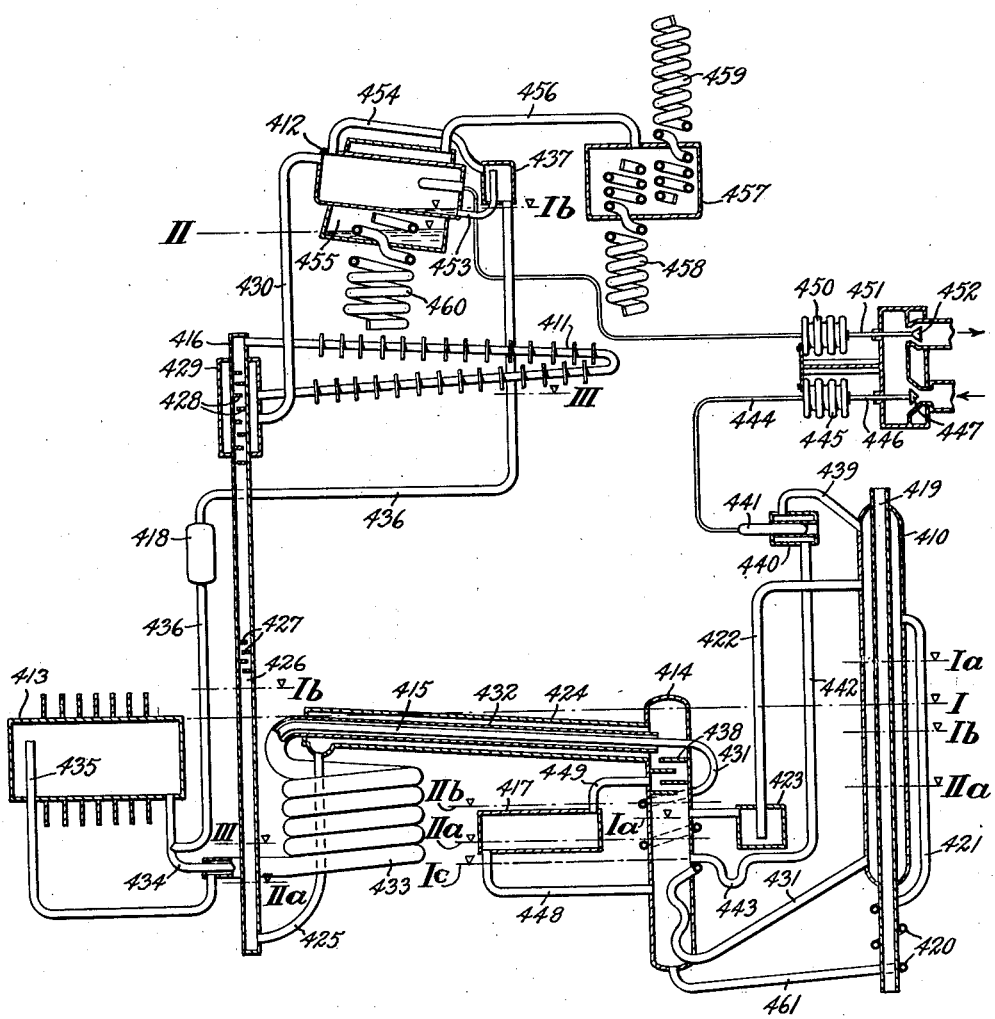
Figs. 10, 11, 12 and 13 represent elevational views, partly in cross section, of other embodiments of my invention.

In Fig. 10 I have shown a further embodiment of my invention. The apparatus includes a generator or boiler 410 and a thermosiphon coil 420 adapted to be heated by means of a gas flame or an electric heating element arranged within the central flue pipe 419. A thermosiphon riser 421 connects the top of coil 420 with the upper part of the generator. The generator communicates with a vessel 414 by means of conduits 439 and 442 and by means of conduit 422 adapted for conducting vapor from the boiler, and also by means of a conduit 461 adapted for conveying liquid from vessel 414 to the thermosiphon coil 420. Vessel 414 communicates in turn with a liquid volume variation vessel 417 by means of conduits 448 and 449. An upwardly inclined tube 424 is connected at its lower end to the upper part of vessel 414 and at its upper end to a conduit 425 which is in turn connected to riser 426, which riser is connected at its upper end to a condenser 411. The lower end of the condenser is connected to a rectifier jacket 429 in turn connected to an evaporator 412 by means of a conduit 430. Inside the inclined tube 424 is arranged part of a liquid heat exchanger 415 of conventional concentric type which extends outside tube 424 and is connected to absorber-reservoir 413. The inner tube of the liquid heat exchanger 433 continues at the lower end of the inclined tube 424 as conduit 431 which is connected to the generator 410. The evaporator 412 communicates by means of pipes 453 and 454 with a draining vessel 437 to which is connected a drain connection 436 which is connected into the liquid heat exchanger member 434 at its upwardly extending end adjacent to its entrance into the absorber-reservoir 413. Surrounding the evaporator 412 is a jacket 455 having no fluid connection with the conduits heretofore described. Said jacket 455 is equipped with an indirect heat transfer system 460 in the shape of a closed coil. Connected to the upper portion of jacket 455 is a pipe 456 leading into a vessel 457. Projecting into said vessel are arranged two hermetically sealed volatile fluid containing heat transfer members 458 and 459, the first of which extends downwardly outside vessel 457 and the second one extending upwardly into the atmosphere. The heat transfer members 460 and 458 project into the space to be cooled, whereas vessels 412, 455 and 457 are preferably embedded in an insulation having a low heat storage capacity.

The system also includes two combined thermostats comprising a bulb influenced by the temperature of the evaporator 412, and a second bulb influenced by the temperature of jacket 440 included in conduit 439.

The apparatus is charged to approximately the level I, indicated in the drawings, with an ammonia solution, and contains no other fluid within the system proper. The heat transfer members 455—460 will be described later on.

The apparatus will operate in the following manner:—

When heat is applied to the lower end of flue pipe 419 there will occur a thermosiphon vapor expulsion and liquid lifting action in conduits 420 and 421 accompanied by an expulsion of ammonia vapor from the solution in the generator. Due to this thermosiphon action, solution will be withdrawn from vessel 414 and transported through the generator 410, through conduit 431 and through conduit 434 into reservoir 413. Part of this liquid will be elevated into conduit 436 and into an interposed vessel 418, due to a slight overpressure emanating from the vapor expelled from the generator. The volume of vessel 418 should be sufficient to take up the amount of solution which was originally charged into the vessel 414 above the level therein designated by Ia. The vapor expelled in the generator passes through conduit 422 and bubbles through a pool of solution in a vessel 423 and thence through baffles 438 in vessel 414 into the inclined tube 424. Part of the water content which is entrained in the vapor from the generator condenses on baffles 438 and on pipe 432 which is a part of the heat exchanger 415. From tube 424 the vapor then passes downwardly through pipe 425 which forms a liquid seal, and bubbles through the analyzer pipe 426 and passes through baffles 427 into the inner tube 416 of rectifier 429 where the final rectification occurs on baffles 428. From the rectifier, the vapor passes into condenser 411 where it will condense into pure or substantially pure ammonia liquid. The liquefied ammonia passes through the outside jacket of rectifier 429 and thence upwardly through pipe 430 and into the evaporator 412. Due to the action of the thermosiphon 420, 421 during the expulsion period of the apparatus, there will be set up in the system a circulation of the ammonia solution as follows:—

Due to the gravity of the solution which is fed into the generator by the action of the thermosiphon 420, 421, said solution will, as described, flow from boiler 410 into conduit 431 and thence into the inner tube 431 of the liquid heat exchanger 433 and through pipe 434 into the bottom of the main absorber-reservoir 413. From the reservoir 413, rich solution, which has a tendency to accumulate in the upper strata of said vessel, will be displaced into conduit 435 from where it passes through the outside tube of the liquid heat exchanger 433. Due to its passage in countercurrent with the weak solution from the generator, it will be preheated in the liquid heat exchanger and further preheated during its passage through tube 432 in the extension of the liquid heat exchanger inside tube 424 due to the heat liberated by the vapors coming from the generator. The rich solution then passes downwardly over the baffles 438, where it is further preheated, and down into the bottom of vessel 414 and thence back to the thermosiphon, by means of which it is again elevated into the generator. Due to the intimate contact between the hot vapor passing upwardly through baffles 438 and the rich liquid passing downwardly through or over the same baffles, there will take place an analyzer effect in vessel 414 which will render the expulsion of ammonia vapor from the rich solution more effective than without said baffles. Within the heat exchanger extension 432 inside the inclined tube 424 there may also occur an ebullition in the rich solution, which should further enhance the efficiency of the expulsion.

Due to the expulsion of vapor from the solution in the apparatus during the expulsion periods, there will occur a continued shrinkage in the amount of solution equivalent to the amount of condensed ammonia accumulating in the evaporator 412. This shrinkage will locate itself essentially in vessel 414 and the adjoining vessel 417. The point of outflow from the liquid heat exchanger 433 into tube 432 (the uppermost part of the heat exchanger as a whole) will determine the level I to which the apparatus was charged. The level inside the generator will have a tendency to accommodate itself to level I. Due to the pressure head, however, which has to be exerted inside the generator to cause the vapor to bubble through the liquid pool in vessel 423, the liquid level in the generator will be depressed approximately to level Ib, aside from the rise in said level which is due to the friction in the circulation system. During the main part of the expulsion period, no vapor will pass through conduits 439 and 442 from the boiler, since this conduit enters vessel 414 at a relatively low point. The level inside pipe 442 during the first part of the expulsion period will be determined by the point of outlet of pipe 422 in vessel 423. Not until the liquid levels in vessels 414 and 417 have dropped below the point of connection of vessel 423 and vessel 414 will there be any further lowering of the liquid level in pipe 442. When the level in vessel 414 has been lowered to what is designated on the drawing as Ic, the level in 442 will have dropped sufficiently to break through the liquid trap 443. Immediately after liquid trap 443 has thus been blown through, all the vapor expelled from the boiler will pass through conduit 439 through jacket 440 and through pipe 442 since this passage now affords the easiest communication between the generator and vessel 414. Due to the passing of vapor through jacket 440, the thermostat bulb 441 which has heretofore been kept relatively cool, will now be rapidly heated, causing the heat supply to the generator to be interrupted or restricted by means of a valve 447 due to the action of the thermostat bulb 441, tubing 444, bellows 445 and valve rod 446. This cutting off of the heat supply will result in the ending of the expulsion period so that the absorption or cooling period can now begin.

The absorption period will now proceed in the following manner:—

The shutting off of the heat supply to the generator will obviously cause a pressure drop in the system due to the cooling off of the condenser and due to heat radiation from the generator and other warm parts. Since the evaporator is in communication with the generator system by means of conduits 426 and 436, both of which are adapted to form a liquid seal at their lower ends, a pressure drop caused by continued heat radiation from the generator system will produce depression of the liquid levels in these conduits. The lowering of the liquid level in conduit 436 will cause a liquid displacement corresponding to the volume of conduit 436 and of the interposed vessel 418 into the liquid circulation system. This displacement will take place through conduit 435, so that a quantity of solution will drip from pipe 432 onto baffles 438 in vessel 414. This quantity of solution will absorb a certain amount of vapor stagnant in vessels 414, 417, 424 and in generator 410, so that a further drop in pressure in these vessels (the generator system) will be produced. The surface levels in the vessel 414 and in the generator will thus change, due to the drop in pressure, to, for example, the levels marked IIa. Due to this continued pressure drop in the generator system, the liquid level in conduit 436 will rapidly fall to the point of entrance into pipe 434, this level being designated in Fig. 10 by III. Parallel to the lowering of the liquid level in conduit 436 there will be a corresponding lowering of the liquid level in pipe 426. The trap formed by conduit 425 and pipe 426 will, however, always contain some solution since its lowest point is located a sufficient distance below the level designated by III, so that no vapor can pass from pipe 426 into conduit 425. Vapor from the evaporator will therefore pass into conduit 434 and bubble up into the absorber vessel 413 where absorption takes place. The siphoning action produced by the bubbles in that part of conduit 434 which is located above level III causes a liquid circulation upwardly through 434 and downwardly through conduit 435 so that solution will pass through conduit 432, over baffles 438 in vessel 414, through conduits 461, 420, 421, into the generator 410 and back through conduit 431 and ultimately conduit 434. It will be understood that previous to the setting up of this circulation, the generator has cooled down sufficiently to withdraw from vessel 414 a sufficient amount of liquid through conduits 420 and 421, so that it will be filled at least to the point of entrance of conduit 421 into the generator. All absorption of the ammonia vapor coming from the evaporator will take place in pipe 434 and absorber 413, the absorption of the baffles 438 originating solely from the vapors which are entrained into vessels 414 and 417. This will maintain a low pressure in the generator system, so that the liquid level in pipe 436 will always be kept down to permit vapor from the evaporator to flow into pipe 434. The pressure in the system, which during the expulsion period may have amounted to some 300 lbs. per square inch depending on the condensing temperature, will now have dropped to some 15–30 lbs. per square inch, depending on the concentration of the solution and on the temperature of the absorber. The absorption will thus proceed until the major part of the liquid ammonia in the evaporator has evaporated. At this time the level in vessel 414 and volume variation vessel 417 will be, for example, IIb. At the end of the absorption period the thermostat bulb attached to the evaporator 412 will, by means of bellows 450 and valve rod 451, cause the heat to the boiler to be again turned on through valve 452 which will cause the expulsion period to be repeated, since valve 447 is, at this time, open in response to the low temperature of jacket 440.

The combined action of the thermostat valves 447 and 452 during a complete cycle of operation will be as follows:—

When first starting the apparatus, both the valves will be open, since the evaporator bulb is relatively warm whereas bulb 441 is not hot. During the course of the expulsion period, jacket 440 and bulb 441 will be warmed up, but not to the extent as to cause valve 447 to close, there being no vapor flow through jacket 440. When vapor flow takes place through jacket 440 at the end of the expulsion period, bulb 441 will be further heated to such extent that valve 447 closes. The thermostat 441, 444, 445, 446 should now be so timed as not to open again until, due to the cooling down of the evaporator, the valve 452 has closed. This timing can be accomplished in several ways, such as by purely mechanical means (trigger action or the like) or by giving jacket 440 a sufficiently large heat storage capacity in combination with a suitable insulation, so that its cooling down after the close of the expulsion period is sufficiently delayed. At the end of the absorption period, valve 452 will open in response to the rising evaporator temperature so that the heat supply to the generator is again started.

I will now explain the combined action of the evaporator 412, jacket 455, vessel 457 and the various heat transfer members connected therewith. The evaporator jacket 455 is partly filled with a volatile liquid, preferably anhydrous ammonia, to a level designated by II, while vessel 457, which communicates with the jacket by means of conduit 456, is charged with an absorbent for the refrigerant contained in the jacket 455, such as calcium chloride. This absorbent will absorb the main part of the ammonia charge to the point of saturation. Thus the system comprising jacket 455, conduit 456 and vessel 457 constitutes an intermittent system operable on the intermittent principle. The heat transfer members 458 and 460 have their lower ends disposed in the space to be cooled, whereas the heat transfer member 459 is adapted to be cooled preferably by air at its upper end. If we assume that the absorption period is under way and that the calcium chloride in vessel 457 is saturated with ammonia, the lowering of the temperature of the evaporator 412 will cause a withdrawal of ammonia vapor from the contents of vessel 457. A cooling effect equivalent to the total heat of absorption of gaseous ammonia in calcium chloride is hereby produced in vessel 457 and is transferred into the space to be cooled by means of the heat transfer member 458. Some cold is also transferred to the space to be cooled by means of the heat transfer member 460. During the expulsion period in the main system, when no condensation can take place on the surface of the evaporator 412 inside the jacket 454 due to its rise in temperature, the liquid ammonia which has accumulated in jacket 454 will again be absorbed in vessel 457, the heat of absorption being transferred to the atmosphere by means of the heat transfer member 459. Due to this absorption, the liquid ammonia contained in the bottom of jacket 455 will evaporate and produce a continued cooling effect during at least a large portion of the expulsion period.

The hermetically sealed heat transfer members 458, 459 and 460 should be partially filled with a volatile liquid to a suitable level.

By means of this arrangement, I have attained a continuation of the cold delivery to the space to be cooled even under the expulsion period which is a distinct improvement applicable to each of the intermittently operating refrigerating apparatuses of this specification. It is obvious that the jacket 455 and especially its ammonia pool at the bottom should be attached to the evaporator 412 in such a manner that the immediate heat transfer therebetween, by means of conduction and radiation, should be as small as possible, so that the cold delivery by means of member 460 should be as efficient as possible during the expulsion period when the evaporator 460 is warmed up. This structure and its mode of operation are made the subject matter of a separate application filed by me on Feb. 10, 1934, Serial No. 710,629.

Figure 11:
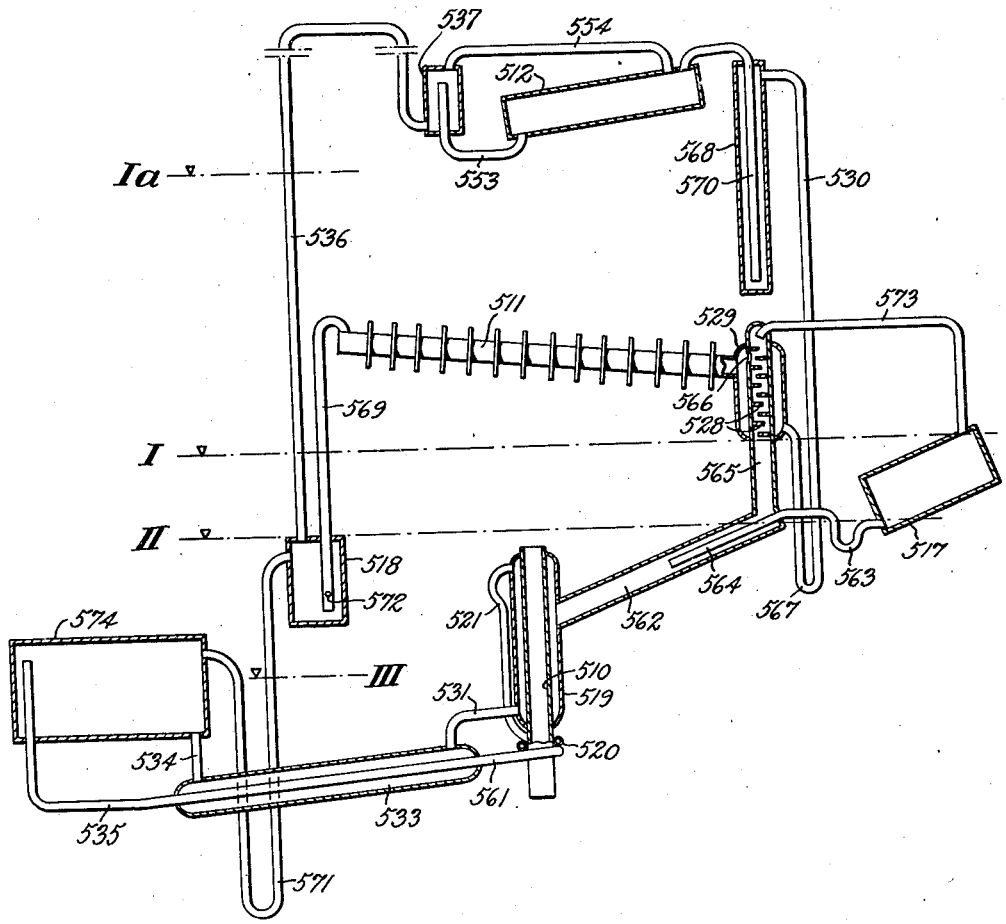

In Fig. 11 is shown still another embodiment of the invention. The structure shown comprises a boiler or generator 519 having a flue pipe 510 and a thermosiphon 520, 521. Connected to the upper part of generator 519 is an upwardly inclined pipe 562 which at its upper end is continued into a riser 565 in part forming a rectifier having baffles 528. From the upper part of the rectifier a conduit 573 leads downwardly into a volume variation vessel 517 which is connected at its lower end to a pipe 564 projecting downwardly into the aforementioned inclined tube 562. Pipe 564 is equipped with a liquid trap 563. In the upper part of the riser or rectifier 565 is a hole 566 affording a gas communication between the inner space of the rectifier and a surrounding jacket 529. Connected to the upper part of jacket 529 is an inclined condenser tube 511 adapted to convey liquid condensed in the condenser back to the rectifier jacket. At the upper end of the condenser tube 511 is attached a siphon pipe 569 leading downwardly into a chamber 518. Near the bottom of this siphon pipe there is a hole 572. Connected to the bottom of rectifier jacket 529 is a conduit 530 forming a trap 567 and extending upwardly to connect into a trap vessel 568. Trap vessel 568 communicates with the evaporator 512 by means of conduit 570. The evaporator communicates, by means of conduits 553 and 554, with a draining chamber 537 from which a drain 536 leads back into the aforementioned chamber 518. The system also comprises an absorbent storage vessel 574 which is connected by means of pipes 535, 561 and 531, 534, forming a liquid heat exchanger 533, to the generator 519. Between the chamber 518 and vessel 574 there is provided a trap conduit 571.

The apparatus is filled approximately to the level indicated by I with a suitable ammonia solution. The operation of this apparatus, Fig. 11, is as follows:—

Heating of the generator 519 causes expulsion of vapor from solution therein, which vapor passes upwardly through the inclined pipe 562, through riser 565, through rectifier baffles 528 where rectification takes place, and further through aperture 566 into condenser 511 where the vapor is condensed into liquid ammonia. No vapor will pass through conduit 569 since the bottom end of said conduit is submerged in liquid in chamber 518. Liquid ammonia flowing back from the condenser into the rectifier jacket 529 cools the rectifier sufficiently to produce adequate rectification. From the rectifier jacket, the condensate is forced upwardly through conduit 530 and through the trap 568, 570 into the evaporator 512. Corresponding to the liquid column thus situated in conduit 530, there will also be formed a liquid column in conduit 536 which will approximate the level indicated as I₁. Due to the action of the thermosiphon 520, 521, a circulation of solution will be set up through the absorption liquid reservoir 574 and through the liquid heat exchanger 533 as has been disclosed in this specification in connection with other apparatus. The loss of liquid from the generator to the evaporator during the course of the expulsion period will be replenished from the contents of the volume variation vessel 517, which liquid will flow through trap 563 and conduit 564 directly into the generator system. The provision of the equalizing connection 573 serves to facilitate this draining of the contents of the volume variation vessel into the generator system. The arrangement of conduit 564 inside the inclined pipe 562 serves to conserve the amount of heat supplied to the generator since it will produce an analyzer effect similar to what has been described in conjunction with the apparatus shown in Fig. 10. The provision of trap 563 serves to prevent any gas bubbles, which may form inside conduit 564, from finding their way back to the volume variation vessel 517, which would diminish the analyzer effect. When the expulsion period has continued far enough to substantially fill the evaporator with liquid refrigerant, the draining arrangement consisting of conduits 553, 554, vessel 537 and conduit 536 will spill over a portion of the bottom strata of the evaporator contents where such water as may have remained there from an earlier evaporation period will have collected. The liquid level in the volume variation vessel 517 and in pipe 565 will at this time have dropped to what is indicated in Fig. 11 as level II. At this time the heat supply to the generator is shut off. As a consequence thereof, the temperature of the volume variation vessel 517, condenser 511 and of other warm parts will drop. Due to this drop of temperature, a slight absorption of vapor will take place on the moist walls inside vessel 517 and on rectifier baffles 528. This produces a slight underpressure within such parts of the system as are in gas communication with the vessel 517 and this causes the liquid columns in conduits 536 and 570 to drop. From conduit 536 the liquid level will drop first into chamber 518 and thence into conduit 571 until it reaches approximately the level designated by III. There will likewise be a suppression of the level in conduit 570, the liquid contents of which will be displaced into pipe 568. A further column may also be formed between the legs in trap 567. The subpressure in the vessel 517 will also cause liquid from chamber 518 to rise into conduit 569 until it overflows into condenser 511. The vertical distance between orifice 572 and the top of conduit 569 will in fact determine the maximum pressure difference between the evaporator system and the vapor system which includes the vessel 517. When solution elevated through conduit 569 spills into the condenser 511 it will absorb vapor contained in the condenser, thus producing a continued and accelerated pressure drop in the condenser and consequently also in the vessel 517. After the liquid level in chamber 518 has dropped to the point of the orifice 572 vapor will enter conduit 569. Due to the entrance of vapor into conduit 569, the overpressure in the evaporator system will be diminished, so that the liquid in conduit 571 will again rise into chamber 518. Thus a liquid circulation (which may be somewhat intermittent) will be set up through conduit 571, chamber 518, conduit 569, condenser 511, aperture 566, pipes 565 and 562, conduit 531, through the liquid heat exchanger and conduit 534, through the absorption liquid reservoir 574 and back to the aforementioned conduit 536. Absorption of the vapor coming from the evaporator will take place both in conduit 569 and condenser 511, so that the latter will now act as an absorber during this absorption period, while acting as a condenser during the expulsion period.

I prefer to enclose the liquid trap 568, 570 within the space to be cooled or else to keep this trap well insulated from heat so as to avoid losing by evaporation too much of its refrigerant contents during the absorption period, lest the liquid seal in this trap will break during the course of the absorption period. After the absorption has continued until the evaporator temperature has again begun to rise, i. e., when the major portion of its contents has been transferred back into the solution, the liquid level in volume variation vessel 517 will have risen to the initial height designated by I. At this time the apparatus is ready for a new expulsion period which will proceed as has been heretofore described. It is obvious that at the end of the absorption period there will be some absorption liquid remaining in the rectifier jacket which liquid, on starting the expulsion period again, will be transferred to the evaporator. It is therefore desirable that the dimensions of the rectifier jacket be diminished so as to hold a minimum quantity of liquid, compatible with its proper function as a rectifier.

Figure 12:
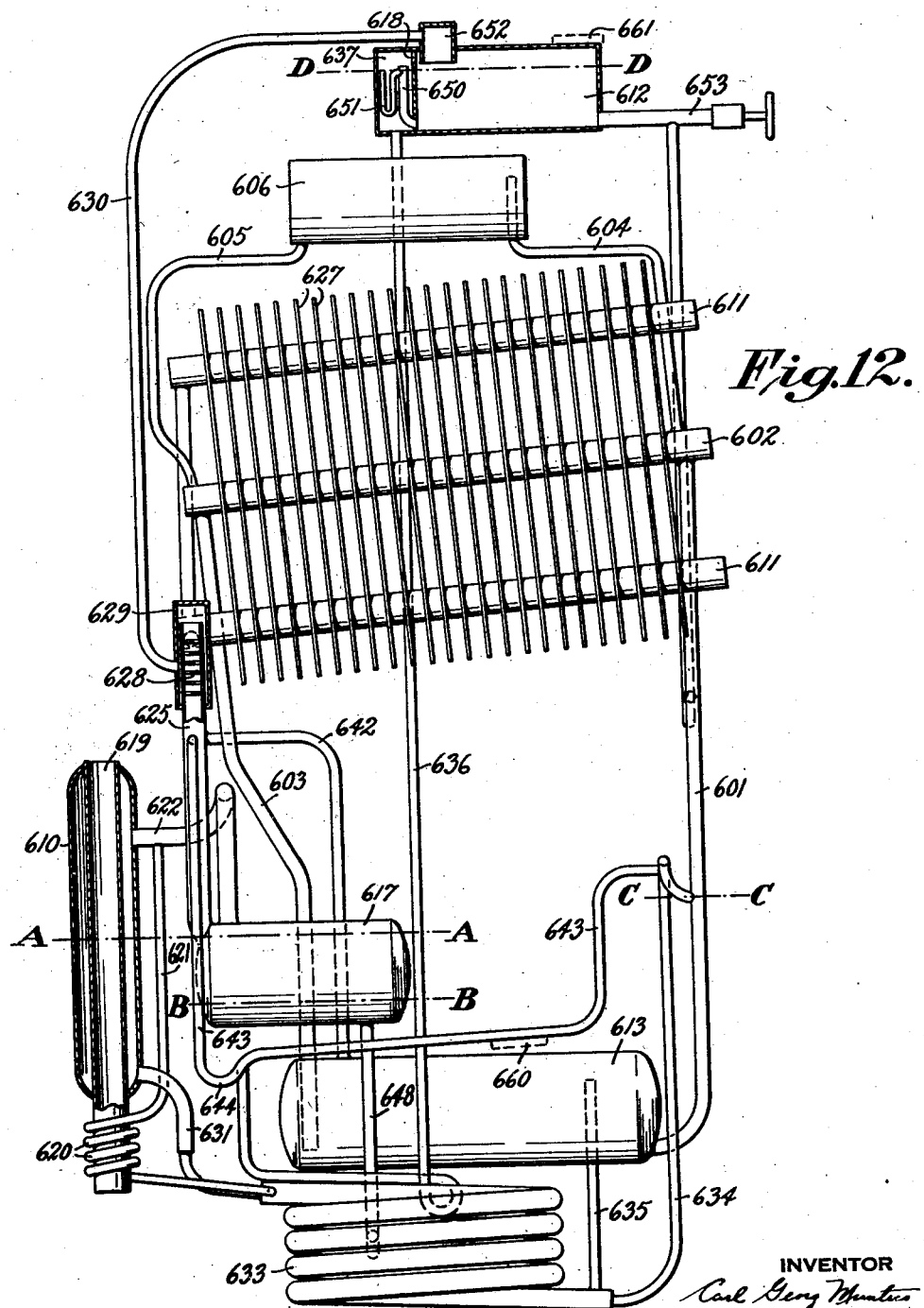

Fig. 12 shows still another embodiment of my invention. The system here disclosed comprises a boiler or generator 610 having a central flue pipe 619. The boiler is also equipped with a thermosiphon coil 620 and a thermosiphon riser 621. The generator communicates by means of a pipe 622 with a volume variation vessel 617 which in turn communicates with a rectifier 628, 629 by means of a pipe 625. Communicating with the rectifier are two condenser pipes 611 having cooling flanges 627 in common. A conduit 630 leads from the rectifier into a dome 652 of an evaporator 612. The evaporator is subdivided into two compartments by means of a wall having an aperature 618, the smaller compartment 637 containing a draining trap 650, 651. A conduit 636 extends downwardly from compartment 637 and is in contact with a liquid heat exchanger 633 and is connected to a conduit 643. Conduit 643 connects the upper portion of pipe 625 with a pipe 634 and is bent to form a trap 644 located below the bottom level of the volume variation vessel 617. An absorption liquid reservoir 613 is connected by means of conduit 635 through heat exchanger 633 with the thermosiphon coil 620. The generator 610 is connected with the same heat exchanger by means of conduit 631 and communicates at the other end of the heat exchanger with conduit 634 which includes a gas trap at its point of connection to a riser 601. Riser 601 extends upwardly from the absorption liquid reservoir 613 into an absorber element 602 arranged centrally between the condenser pipes 611 and imbedded in the cooling flanges 627 in common with the condenser tubes. A communication 603 is provided between the lower end of the absorber element 602 and the bottom of the absorption liquid reservoir 613. An auxiliary liquid volume variation vessel 606 having two downward connections 604 and 605 leading to the absorber element 602 is located above said element 602. An equalizing connection 642 unites the upper portion of pipe 625 with the top of the absorption liquid reservoir 613. A drain connection 648 extends from the bottom of the volume variation vessel 617 into the outer tube of the liquid heat exchanger 633 affording a liquid passage from the vessel 617 via conduit 620 to the generator. The evaporator 612 is provided with a drain conduit and valve 653 which affords a communication with the riser 601.

The apparatus is filled to approximately the level A—A with an ammonia solution, this level corresponding to the approximate level in the volume variation vessel 617 at the end of an absorption period. In addition to this charge there should be a further amount of solution charged into the apparatus equivalent to the volume of the absorber element 602 and the auxiliary volume variation vessel 606, which vessels will normally be filled with liquid at the conclusion of an absorption period. The apparatus can be charged by means of a charging plug attached to any part of the system. I prefer, however, to attach the charging plug to the volume variation vessel 617 so as to be able to determine the proper level in vessel 617 during the testing procedure.

The operation of this apparatus is as follows:—

Application of heat to the generator 610 causes expulsion of vapor from the generator contents. The vapor passes through conduit 622 into the volume variation vessel 617 where it is cooled down to some extent, the heat being given off to vessel 617 and to its contents. Thence the vapor passes upwardly through pipe 625, which will produce an analyzer effect, and through the rectifier baffles 628 where the final rectification takes place. The vapor then passes into condenser pipes 611 which are connected to the rectifier jacket 629. Due to the generation of vapor, the pressure in the system now described will rise until the prevailing temperature of the condenser permits vapor to condense in pipes 611. Condensate will then flow by gravity from the condenser pipes back into the rectifier jacket 629 in which some of this condensate will again be boiled off due to the action of the rectifier, only to condense again in the condenser pipes. The condensate will accumulate in the rectifier jacket up to the level where conduit 630 enters the same and can rise no higher, since any excess quantity supplied to the jacket will be elevated through pipe 630 into the evaporator dome 652 and into the evaporator 612. Due to the rise in pressure caused by the action of the generator, the absorber element 602, although located at a higher level than the generator, will be entirely filled with liquid through pipes 601 and 603 from the absorbent vessel 613. The same will be true of vessel 606 which communicates with the absorber element 602 by means of conduits 604 and 605. Due to the action of the thermosiphon 620, 621, there will be set up between the generator and the absorption liquid storage vessel 613 a liquid circulation through the heat exchanger 633 in a similar manner as has been already described in conjunction with other apparatuses embodying the invention. It will be seen that the weak solution returning from the generator through conduits 531, 634, will return to the absorption liquid reservoir 613 by way of the riser 601.

The volume variation or differential of the solution will, during the course of the expulsion period, locate itself in the volume variation vessel 617 in which the liquid level will drop to what is designated in Fig. 12 as the level B—B. The differential liquid volume will, during this period, find its way from vessel 617 into the generator through conduit 648 which connects the bottom part of the equalizing vessel 617 with the outer pipe of the heat exchanger 633 which is connected to thermosiphon 620. It is obvious that the free liquid level in the equalizing connection 642 will be approximately the same as that prevailing in vessel 617. The same will also be true for the free liquid level in that part of conduit 643 which is situated between trap 644 and riser 625. During the expulsion period, the evaporator 612 will gradually be filled with liquefied ammonia. When this liquefied ammonia has reached the level indicated as D—D in the evaporator, the trap 650, 651 will spill over a portion of the bottom stratum of the evaporator contents into chamber 637, whence it will flow by gravity down through conduit 636 into trap 644 of conduit 643. On its passage through conduit 636, this liquid will be exposed to heat emanating from the heat exchanger 633, since conduit 636 is at its lower end soldered or welded to a suitably warm portion of the liquid heat exchanger. As long as the liquid coming from chamber 637 has a substantial water content, no gasification thereof will take place on its passage past the warm portion of the heat exchanger. However, when the water containing stratum from the evaporator has thus been drained off, so that essentially pure liquid ammonia is brought into the warmed locality described, it will be gasified due to the influence of heat from the liquid heat exchanger. The vapor thus formed will pass into conduit 643 causing a siphoning action which will elevate all of the liquid in conduit 643 into riser 601. This affords a direct gas communication between riser 625 and riser 601. Through this gas communication there will now be a rapid flow of vapor from the generator system into riser 601, the driving head causing this flow being a liquid column equal to the vertical distance between level C—C and B—B. Part of the vapor from the evaporator may also find its way into conduit 643 through conduit 636. The hot vapor coming from the generator and passing through conduit 643 will cause a thermostat bulb 660 which is in thermal connection with conduit 643, to be heated, which by means of a thermostatic arrangement not shown in the figure will cause an interruption of the heat supply to the generator. Vapor flow through conduit 643 into riser 601 will continue, however, first because the generator will still be giving off a definite quantity of vapor due to its relatively high temperature, and secondly because vapors emanating from the evaporator will be free to pass downwardly through conduit 630, through the rectifier jacket 629, through baffles 628, and further through pipe 625 into conduit 643 under the influence of the driving column, namely the vertical liquid height between levels C—C and B—B. The pressure in the system will now be rapidly dropping since the vapor entering riser 601, whether it comes from the generator or from the evaporator, will be readily absorbed. The absorption period is now under way. The vapor entering riser 601 will set up a rapid liquid circulation in the liquid circuit including conduit 601, absorber element 602, conduit 603 and absorption liquid reservoir 613 due to a siphoning action in riser 601. Absorption will take place not only in riser 601 but also in the absorber element 602 where the heat of absorption is rejected by aid of the flanges 627 into the atmosphere. Since the rate of gas flow from the evaporator into the absorbing cycle is determined solely by the aforementioned liquid column and by the gas resistance in the vapor connection from the evaporator to riser 601, the rate of vapor flow from the evaporator may occasionally be larger than what corresponds to the heat rejecting capacity of the absorbing system under the prevailing conditions. If such is the case, there will occur an accumulation of unabsorbed vapor in the top portion of the absorber element 602 which would render the absorber element 602 partly ineffective were it not for the action of the auxiliary vessel 606. Unabsorbed vapor in element 602 will now pass upwardly through connection 604 into vessel 606 where it will accumulate at the top, thereby causing an equal amount of absorption liquid to be discharged through conduit 605, element 602, connection 603, reservoir 613, conduit 635, and connection 648 into the main liquid volume variation vessel 617 where it will cause a rise of the level represented by B—B. This rise of level B—B will in turn cause a reduction of the driving column C—C minus B—B, so that the rate of vapor flow into riser 601 is hereby diminished. The absorber element 602 can also be connected to conduits 601 and 603 in a reversed way, so that vapor entering the absorber element through conduit 601 will travel upwardly along the entire length of the element before reaching conduit 604. Such arrangement will further enhance the rate of absorption in element 602. During the absorption period the volume of ammonia solution in the apparatus will increase, so that the liquid level in the vessel 617 will have a tendency to rise. Such rise will cause a reduction in the aforementioned driving column, so that the vapor flow through conduit 643 will be further reduced, causing the flow of vapor through conduit 604 to cease. Absorption in the liquid surface in vessel 606 will then cause absorption liquid to be withdrawn from the circulation system into vessel 606, so that the level in the volume variation vessel 617 will at all times automatically produce a driving column closely corresponding to the capacity of absorption in riser 601 and element 602. If the apparatus is correctly charged, the vessel 606 will be completely filled with ammonia solution towards the end of the absorption period. Thus the apparatus will stabilize itself by automatically distributing the volume differential between the main volume variation vessel 617 and the auxiliary vessel 606 during the absorption period.

The apparatus is operable even without the heat exchange relation between drain conduit 636 and heat exchanger 633. When, due to continued expulsion, the level B—B has dropped down into connection 648 to the neighborhood of the bottom of trap 644, this trap will be blown through by means of vapor from the generator, whereafter the absorption period will proceed identically as has been heretofore described. This mode of operation will, however, require a very accurate charging of the apparatus, since a continued drainage of liquid from the evaporator will prevent level B—B from dropping under a certain level.

When, at the end of the absorption period, the evaporator is empty of evaporable contents, there will naturally be no more vapor flow through conduit 643, so that, due to the absorption of vapor at the point of entrance of conduit 643 into riser 601, absorption liquid will flow into pipe 643 and again fill up trap 644, making the apparatus ready for another expulsion period. At this time the thermostatic bulb 661, attached to the evaporator, will have risen in temperature, so that by means of a thermostatic device connected to bulb 661, although not shown in the figure, the heat supply to the generator will again be opened. The cooperation of the thermostats 660 and 661 should be arranged in an analogous manner to what has been described in conjunction with Fig. 10.

The action of the draining arrangement in chamber 637 adjoining the evaporator is as follows:—

When a portion of refrigerant and entrained water, followed by an amount of pure refrigerant, has been spilled over into conduit 636 and caused the absorption period to start, as previously described, it is important that the draining arrangement be such that no large excess of liquid refrigerant is drained out through this passage. For this reason the trap 650, 651 is so constructed that the diameter of tube 650 is considerably larger than that of trap 651. The pressure drop in the system, which accompanies the starting of the absorption period, will cause ebullition of the liquid refrigerant contained in tube 650, and it is for the purpose of preventing a siphoning action through tube 650 caused by such ebullition that the diameter of said tube has been chosen relatively large. There will then form in the upper portion of tube 650 a gas plug which will prevent any excess of refrigerant from passing through the trap arrangement 651 out into chamber 637.

The drain cock 653 serves to quickly drain the evaporator of entrained solution in connection with the first starting of the apparatus after shipment in case the apparatus has been turned around or if the evaporator has been filled with ammonia solution. This drain cock has been introduced more for convenience than by necessity since the automatic draining arrangement described will in a couple of cycles produce the same effect. The evaporator can obviously also be drained by tilting the apparatus at a suitable angle towards the left in the figure.

Figure 13:
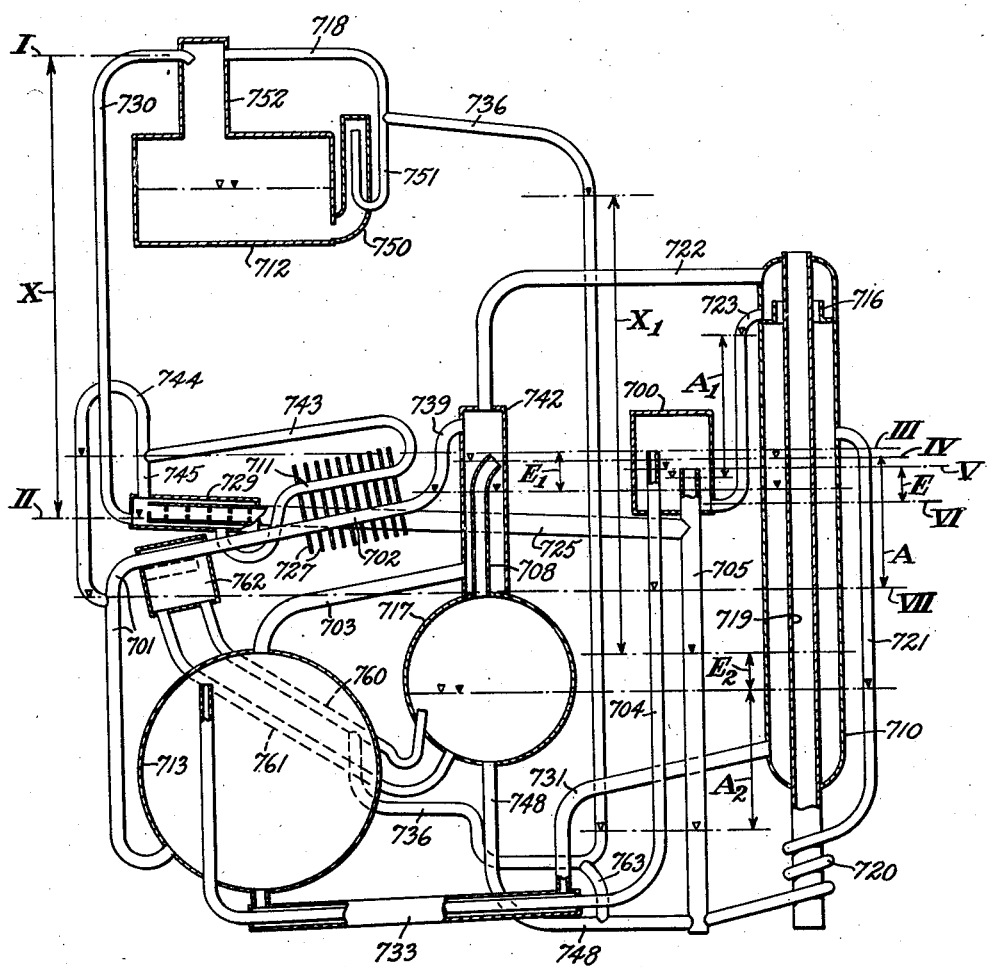

Fig. 13 shows still another embodiment of my invention. The apparatus comprises a boiler or generator 710 having a flue 719 and a thermosiphon liquid lift 720, 721. At the top of the generator, a baffle 716 is provided, above which two conduits 722 and 723 are connected. Conduit 722 is connected to a riser 742 extending from a liquid volume variation vessel 717. Conduit 723 is connected to the bottom of a trap vessel 700. Two pipes 704 and 705 extend downwardly from vessel 700, the first of which forms a connection through a liquid heat exchanger 733 with an absorption liquid reservoir 713, while pipe 705 is connected at the bottom to the thermosiphon and also by way of a conduit 748 to the bottom of the volume variation vessel 717. Riser 742 is connected at its lower end to the reservoir 713 by means of a conduit 703. Riser 742 communicates with the vessel 717 by means of an inside pipe 708. The absorption liquid reservoir 713 is connected to the lower end of the generator by way of the liquid heat exchanger 733 by means of conduit 731. From the storage vessel 713, a pipe 701 extends upwardly and is connected to an inclined absorber element 702 having fins 727. The upper end of the absorber element 702 is connected to riser 742 by means of a conduit 739.

An inclined analyzer pipe 725 is connected to pipe 705, immediately underneath the trap vessel 700 and is connected to a rectifier jacket 729. Jacket 729 has a vapor connection 745, 743 with a condenser element 711 which has fins 727 in common with the absorber element 702. The condenser element has a drainage connection back to the rectifier jacket 729. A vapor connection 744 is provided between pipe 745 and pipe 701.

From the rectifier jacket a relatively narrow conduit 730 extends upwardly into a dome 752 at the top of an evaporator vessel 712. Near the bottom of the evaporator 712 is connected a drain trap comprising a relatively wide pipe 750 and a smaller sized U-bent tube 751 which has a gas connection 718 with the dome 752 and to which is connected a downwardly extending draining connection 736. Draining connection 736 forms a trap at its lower end and is further thermally associated with a portion of conduit 748 and is connected to a pipe 760. Pipe 760 unites the volume variation vessel 717 with an auxiliary vessel 762 from which a second conduit 761 extends back into the bottom of the vessel 717. The auxiliary vessel 762 is arranged in heat exchange relation with a portion of conduit 701. A conduit 763 unites the lowest portion of pipe 736 with pipe 748.

In the figure are shown a number of horizontal level lines numbered I–VII. Level I represents the point of entrance of conduit 730 into the evaporator dome 752. Level II is drawn through the point of connection between the rectifier jacket and conduit 730. Level III represents the top point of pipe 704 in the trap vessel 700. Level IV goes through the top point of pipe 708 inside riser 742. Level V is drawn through the top point of pipe 705 inside trap vessel 700. Level VI represents the entrance level of trap conduit 723 into trap vessel 700. Level VII goes through the junction of conduits 744 and 701. The distance between levels I and II is designated by X, the distance between levels V and VI by E and the distance between levels IV and VII by A. The E stands for expulsion period and the A for absorption period.

In the figure are further shown a number of black and light (open) level marks. The black marks indicate conditions prevailing during the expulsion periods, whereas the light marks indicate the status during the absorption periods.

The apparatus should be charged with a volume of ammonia-water solution equivalent to the sum total of the contents of the various vessels and pipes beneath the respective level marks. The charge should preferably be made into the absorption liquid reservoir 713 from which it will distribute itself to the rest of the system. The desired levels will be produced automatically after some time of operation.

The apparatus represented by Fig. 13 operates as follows:

Applying heat to flue pipe 719 will cause a thermosiphon action in conduits 720 and 721, so that some liquid will be withdrawn from the volume variation vessel 717 through tube 748 and elevated into the generator 710. From the generator, heated weak solution flows by gravity through conduit 731 by way of the liquid heat exchanger 733 where it is cooled and into the reservoir 713 to be stored therein, displacing an equal amount of rich solution which will be forced back through the liquid heat exchanger and through tube 704 into the trap vessel 700. From the trap vessel the rich solution heated in the heat exchanger 733 drips down through pipe 705 from which it is fed into the thermosiphon 720, 721, together with a differential liquid flow from the volume variation vessel 717.

Vapor expelled in the generator passes through the trap conduit 723 into the trap vessel 700 where it bubbles through the rich solution so that an analyzing effect is produced. The liquid head E through which the vapor has to bubble causes a suppression of the liquid level in the generator below level III by an amount equal to the distance $E_1 = E$. Vapor will also enter riser 762 and variation vessel 717 directly from the generator through communication 722. Since there is an unbroken liquid communication between the bottom of riser 742 and the generator, the liquid level in the riser will be the same as that in the generator, aside from such variations as are due to differences in specific gravity and, in operation, due to the flow resistance in the interconnecting conduits. The same liquid level will also be found in conduit 739 and for the same reason. It should be noted that the absorber heat rejecting element 702 should be located underneath said level, lest condensation take place there during the expulsion period.

A fraction of the vapor expelled in the generator will be condensed and absorbed in the volume variation vessel 717 which is preferably heat insulated. The heat thus liberated in vessel 717 will cause its temperature to rise sufficiently to reduce the continued condensation and absorption to a minimum. At the end of the expulsion period, the vessel 717 is practically empty of solution, the solution having found its way to the generator. The larger part of the sensible heat lost to the vessel 717 during the start of the expulsion period will thus be regained towards the end of the expulsion period because the liquid contents of the equalizing vessel were preheated before entering the generator.

The ammonia vapor from the generator and from the trap vessel 700 will, during the expulsion period, pass through the inclined pipe 725 into the rectifier jacket 729, and thence through pipes 745 and 743 into the condenser element 711 where condensation takes place. The condensate flows into the jacket 729 from which it is elevated through conduit 730, due to the pressure built up in the generator, into the evaporator. A liquid column X will be built up in conduit 730 and correspondingly a column $X_1$ will be formed in conduit 736. Absorption liquid returning from the rectifier flows by gravity back through the inclined pipe 725 and drains into pipe 705. This draining method permits the condenser element 711 to be located at a relatively low level and close to the absorber element 702.

When, towards the end of the expulsion period, the liquid in the evaporator has risen into the dome 752 to a level approximating the upper end of drain conduit 736, a quantity of fluid will spill over into conduit 736. This fluid is taken from the bottom of the evaporator where the water percentage is the greatest. It flows by gravity down through conduit 736 and again upwardly into conduit 760. Since conduit 736 is led into heat contact with a warm portion of the apparatus, in this case conduit 748, the fluid, when its content of ammonia is sufficiently high, will vaporize under the influence of the heat transmitted thereto, so that refrigerant vapor will enter conduit 760. This vapor will pass upwardly through conduit 760 and be absorbed in the auxiliary vessel 762, causing this vessel to be heated. The rise in temperature due to the heat of absorption causes a thermostat, the bulb of which is located in said vessel, to shut off the heat supply to the generator so that the expulsion ceases. No liquid from the vessel 717 can at that time enter the lower end of conduit 760 since the liquid level is relatively low in the vessel 717 towards the end of the expulsion period. Siphon action in conduit 760 will now cause the liquid trap at the lower end of conduit 760 to break, so that vapor from the gas space in the vessel 717 is free to pass through conduit 760 into vessel 762, the liquid contents of which are displaced into vessel 717. The liquid displaced from vessel 762 into vessel 717 will rapidly absorb a quantity of the vapor in vessel 717, so that the pressure in the apparatus will suddenly drop. This constitutes the beginning of the absorption period which proceeds as follows:—

The lessening of the pressure in vessel 717 and the generator, which are in open communication, and which may be termed the generator system, causes an inflow of fluid from the rest of the system. Such inflow will take place from the evaporator through conduit 730 rather than through the drain conduit 736, which latter forms a relatively deep trap. The trap portion of conduit 736 will always be supplied with liquid through the cross connection 763.

The overpressure which prevails in the evaporator during the course of the absorption period, is equivalent to the liquid column above the point of entrance of conduit 744 into conduit 701, said column being designated by A in the figure. This overpressure will also force liquid back from the trap vessel 700 into trap conduit 723 so that a column $A_1 = A$ is formed. The same overpressure will further cause a depression of the liquid levels in conduit 736 and in pipe 705 a distance of $A_2 = A$ below the free liquid level in the vessel 717.

Vapor entering conduit 701 from conduit 744 sets up a siphoning action in conduit 701 at the same time as absorption takes place therein. Further absorption occurs in the absorber element 702, the heat of absorption being rejected to the atmosphere through the cooling fins 727. The aforementioned siphoning action will elevate the liquid in conduit 739 so that it flows into riser 742 from which it returns by gravity through conduit 703 into the absorption liquid reservoir 713, displacing weak liquid into conduit 701. The increment in volume, due to absorption, overflows through pipe 708 into the vessel 717. The exposure of moving solution to the gas phase in riser 742 will serve to cause a continued drop in pressure in the generator system, so that the liquid column differential is always assured.

The absorption which occurs in the upper portion of conduit 701 causes this portion to be heated to some extent. This heating, which will continue as long as the absorption period lasts, is utilized for keeping the thermostat bulb in the auxiliary vessel 762 warm during said period. When, finally, at the end of the absorption period the thermostat bulb cools down, heat is again turned on to the generator, so that the expulsion period can start anew. By this time, the liquid level in the vessel 717 is at its maximum. When the pressure increases due to the expulsion, the vapor pocketed in the auxiliary vessel 762 will collapse, so that said vessel is again filled with solution. The evaporator draining trap 750, 751 will, during the absorption period, act in the same way as has been previously described in conjunction with Fig. 12.

Thus I have in this system the advantages previously brought forth. The entire mass of liquid in the system is not uniformly raised to the expulsion temperature but the solution is heated a little at a time and the weakened solution is immediately cooled by the strong solution passing to the heating zone, whereby, with respect to known intermittent systems, a large quantity of heat is conserved. As compared with known systems, the liquid content of the generator is, according to my invention, much smaller than the volumetric capacity of the evaporator or other condensate storing means, and as said capacity of the evaporator or other means is about equal only to the capacity of the so-called volume variation vessel, the fluid heated in the generator during the expulsion periods is rather small in relation to the body of absorption solution contained at the low temperature within the absorption liquid reservoirs of the different embodiments shown in the figures.

The efficiency of my system is very much higher than that of previous systems. By means of my arrangement of structure I am able to introduce a liquid analyzer into a periodically or intermittently operating system. Furthermore, the external cooling can be a constant and it is not necessary to shut off the external cooling source during the expulsion period. This simplifies the control of the system. Due to the maintenance of cold condition of the body of absorption liquid in vessel 713 and conduit 701 and absorber cooling element 702, a large quantity of cold liquid is available for rapidly initiating the absorption period, and it is not necessary to cool that liquid down at the beginning of the absorption period. On account of the small quantity of liquid and metal which is heated during the expulsion period, it is possible to operate the system with very short cycles and this results in the advantage that the apparatus can be made very much smaller for a given capacity. This is a distinct advantage in the cost of manufacture. Furthermore, the ability to operate with quickly recurring cycles makes it possible to obtain a more even temperature of the space to be cooled. Also due to the small quantity of liquid which is heated and on account of the smaller amount of liquid which is contained in the system, my system is entirely safe and has no explosion hazard. In previously known intermittent systems the regulation is complicated since both the heating and the cooling mediums must be regulated and the box or space to be cooled must be maintained within predetermined limits.

My system has a much simpler regulation. With respect to continuously operating systems, my system has a distinct advantage in higher operating efficiency, faster ice freezing and adaptability of the apparatus to a cabinet.

Although I have previously described continuous cooling of the absorber or other liquid containing parts of the system during the heating period, it will be understood that discontinuance of external cooling during the heating period may not constitute a departure from that feature of my invention which resides in the reduction of the main body of absorption liquid to such a low temperature at the end of the heating period that it is immediately available for absorption without further reduction in temperature after the heat has been turned off. It will be seen that a system in accordance with my invention may have, paradoxically, a lower absorber temperature during the heating period than during the absorption period. This may be the case when there is a large heat of absorption due to a heavy load on the evaporator during the absorption period.

A refrigeration system in accordance with my invention is capable of producing extremely low evaporator temperatures during the absorption periods. The temperature may be controlled in any desired manner, for instance by a tank around the evaporator containing a eutectic solution; by control of vapor escape from the evaporator with a valve; by control of the absorber temperature; or by a controlled secondary heat transfer system between the evaporator and the medium to be cooled.

Although I have shown in Figs. 4 and 5 a refrigeration system in accordance with my invention mounted in a refrigerator cabinet of the household type, it will be understood that my invention is not limited to any dimensions of apparatus or capacity and may be embodied in any size or type of refrigerator.

I claim:

1. In a refrigeration system containing refrigerant and absorption liquid and having low pressure periods of refrigerant evaporation and absorption alternating with higher pressure periods of vapor expulsion, the improvement which consists in maintaining the greater proportion of the absorption liquid at a lower temperature during the higher pressure period than during the absorption period while maintaining constant cooling facility during both periods except as modified by variation in heating.

2. In a refrigeration system containing refrigerant and absorption liquid and having low pressure periods of refrigerant evaporation and absorption alternating with higher pressure periods of vapor expulsion, the improvement which consists in maintaining the greater proportion of the absorption liquid at at least as low a temperature during the higher pressure period as during the absorption period while maintaining constant cooling facility during both periods except as modified by variation in heating.

3. In an absorption refrigeration system having low pressure periods of refrigerant evaporation alternating with higher pressure periods of expulsion of refrigerant from solution and having an expulsion component, a liquid filled accumulation component and conduits connecting said components and forming a circuit for circulation of absorption liquid, the combination therewith of a container separate from said expulsion component and in continuously open communication with said circuit arranged and connected to give out and take in absorption liquid in quantities corresponding to the amount of refrigerant expelled from solution and absorbed into solution respectively during the respective periods.

4. In an absorption refrigeration system having low pressure periods of refrigerant evaporation and absorption alternating with higher pressure periods of expulsion of refrigerant from solution, components and conduits forming two distinct circuits, in part overlapping, for flow of absorption liquid during the absorption and expulsion periods respectively, the overlapping portion of said circuits including an unheated absorption liquid reservoir in continuously open communication with parts of both circuits and the circuit for flow of absorption liquid during absorption periods containing a heat rejecting component to which expelled refrigerant is inaccessible during expulsion periods.

5. In an absorption refrigeration system having low pressure periods of refrigerant evaporation alternating with higher pressure periods of expulsion of refrigerant from solution, separate vapor expulsion and vapor absorption components of which the expulsion component is situated at a lower level than the absorption component and the absorption component is unheated during expulsion periods, and means including at least one liquid seal for preventing access of expelled refrigerant vapor to the unheated absorption component during expulsion periods.

6. Absorption refrigeration apparatus having low pressure periods of refrigerant evaporation alternating with higher pressure periods of expulsion of refrigerant from solution and having separate vapor expulsion and vapor absorption components characterized in that said components are in continuously open liquid circulation communication with an unheated absorption liquid reservoir.

7. Absorption refrigeration apparatus having low pressure periods of refrigerant evaporation alternating with higher pressure periods of expulsion of refrigerant from solution and having means for expulsion of refrigerant from solution, an absorption liquid storage reservoir, means to circulate absorption liquid between said expulsion means and said reservoir, and means in addition to the reservoir and the expulsion means for holding absorption liquid at a lower temperature than liquid in the expulsion means at the end of an expulsion period to absorb vapor from the solution in the expulsion means at the end of an expulsion period.

8. In the process of refrigeration including alternate periods of generation and absorption of refrigerant vapor, that improvement which consists in maintaining a main body of absorption solution, continuously cooling said body, withdrawing solution from said body during the generation period in the form of a small continuous stream, heating said stream to expel refrigerant fluid therefrom, separating the expelled vapor from said stream, condensing the expelled vapor, maintaining communication between said separated vapor and main body of solution through a relatively small stagnant surface layer of solution, and maintaining said surface layer above condensation temperature.

9. That improvement in the art of refrigerating by expelling refrigerant at higher pressure and re-absorbing refrigerant at lower pressure which consists in producing circulation of absorption liquid due to the lifting action of vapor and a reactive hydrostatic head, simultaneously heating, weakening and cooling the absorption liquid while circulating, and storing the cooled weakened absorption liquid under a lower hydrostatic head than the aforementioned hydrostatic head and free of gas environment; and thereafter utilizing the stored cool absorption liquid to reabsorb refrigerant vapor.

10. That improvement in the art of refrigerating by expelling refrigerant at higher pressure and reabsorbing refrigerant at lower pressure which consists in simultaneously heating, weakening and cooling absorption liquid, and storing the cooled weakened absorption liquid under low hydrostatic head and free of gas environment; and thereafter utilizing the stored cool absorption liquid to reabsorb refrigerant vapor.

11. That improvement in the art of refrigerating by expelling refrigerant at higher pressure and reabsorbing refrigerant at lower pressure which consists in producing circulation of absorption liquid due to the lifting action of vapor, simultaneously heating, weakening and cooling the absorption liquid while circulating, and storing the cooled weakened absorption liquid under low hydrostatic head and free of gas environment; and thereafter utilizing the stored cool absorption liquid to reabsorb refrigerant vapor.

12. In an absorption refrigeration system having low pressure periods of refrigerant evaporation alternating with higher pressure periods of expulsion of vapor from solution, an absorption liquid containing structure including a reservoir adapted to hold a large quantity of absorption liquid in cold condition, an expeller disposed laterally of said reservoir and conduits for circulating absorption liquid between said reservoir and said expeller, a condenser, an evaporator connected to said condenser, means forming a path of flow for vapor between said expeller and said condenser, a connection between said path and said structure, the parts being so disposed and the system containing liquid so that the reservoir is filled with liquid and liquid extends into said connection while liquid circulates between said reservoir and said expeller.

13. In an absorption refrigeration system having low pressure periods of refrigerant evaporation alternating with higher pressure periods of expulsion of vapor from solution, an absorption liquid containing structure including a reservoir adapted to hold a large quantity of absorption liquid in cold condition, an expeller disposed laterally of said reservoir and conduits for circulating absorption liquid between said reservoir and said expeller and forming a liquid heat exchanger, a condenser, an evaporator connected to said condenser, means forming a path of flow for vapor between said expeller and said condenser, a connection between said path and said structure, the parts being so disposed and the system containing liquid so that the reservoir is filled with liquid and liquid extends into said connection while liquid circulates between said reservoir and said expeller.

14. In an absorption refrigeration system having low pressure periods of refrigerant evaporation alternating with higher pressure periods of expulsion of vapor from solution, an absorption liquid containing structure including a reservoir adapted to hold a large quantity of absorption liquid in cold condition, a thermosiphon element disposed laterally of said reservoir and conduits for circulating absorption liquid between said reservoir and said thermosiphon element, a condenser, an evaporator connected to said condenser, means forming a path of flow for vapor between said expeller and said condenser, a connection between said path and said structure, the parts being so disposed and the system containing liquid so that the reservoir is filled with liquid and liquid extends into said connection while liquid circulates between said reservoir and said expeller.

15. In an absorption refrigeration system having low pressure periods of refrigerant evaporation alternating with higher pressure periods of expulsion of vapor from solution, an absorption liquid containing structure including a reservoir adapted to hold a large quantity of absorption liquid in cold condition, an expeller disposed laterally of said reservoir and means for circulating absorption liquid between said reservoir and said expeller including a thermosiphon element disposed laterally of said reservoir, a condenser, an evaporator connected to said condenser, means forming a path of flow for vapor between said expeller and said condenser, a connection between said path and said structure, the parts being so disposed and the system containing liquid so that the reservoir is filled with liquid and liquid extends into said connection while liquid circulates between said reservoir and said expeller.

16. In an absorption refrigeration system having low pressure periods of refrigerant evaporation alternating with higher pressure periods of expulsion of refrigerant from solution, an expeller, an absorption liquid reservoir adapted to hold a large quantity of absorption liquid in cold condition disposed laterally of said expeller, conduits connecting said reservoir with said expeller for circulation of liquid therebetween, and means for maintaining said reservoir completely filled with liquid.

17. A refrigerating system of the kind having periods of absorption at low pressure alternating with periods of vapor expulsion at higher pressure and having a liquid containing portion including a generator, an evaporator, conduits connecting said evaporator and liquid containing portion, variable heating means for said system, invariable cooling means for said system, and means within the system for withdrawing vapor from the gas space of the generator and contacting said withdrawn vapor with absorption liquid of lower temperature than the temperature of absorption liquid in the generator.

18. A refrigerating system of the kind having periods of absorption at low pressure alternating with periods of vapor expulsion at higher pressure and having a liquid containing portion including a generator, an evaporator, conduits connecting said evaporator and liquid containing portion, variable heating means for said system, invariable cooling means for said system, and means within the system for lowering pressure in the generator by absorption of refrigerant at the beginning of absorption periods, the last-mentioned means including heat rejecting surface having equal capability for heat rejection during expulsion periods as during absorption periods.

19. A refrigerating system of the kind having periods of absorption at low pressure alternating with periods of vapor expulsion at higher pressure having a liquid containing portion including a generator, an evaporator, conduits connecting said evaporator and liquid containing portion, heating means for said system, cooling means for said system, and means within the system for lowering pressure in the generator by absorption of refrigerant at the beginning of absorption periods, the last-mentioned means including heat rejecting surface having equal capability for heat rejection during expulsion periods as during absorption periods.

20. A refrigerating system of the kind having periods of absorption at low pressure alternating with periods of vapor expulsion at higher pressure having a liquid containing portion including a generator, an evaporator, conduits connecting said evaporator and liquid containing portion, heating means for said system, cooling means for said system, and means utilizing flow of refrigerant within the system and independent of application of external cooling for lowering pressure in the generator by absorption of refrigerant at the beginning of absorption periods.

21. A refrigerating system of the kind having periods of absorption at low pressure alternating with periods of vapor expulsion at higher pressure and having a liquid containing portion including a generator, an evaporator, conduits connecting said evaporator and liquid containing portion, heating means for said system, cooling means for said system, and means within the system for lowering pressure in the generator at the beginning of absorption periods by circulation of absorption liquid of lower temperature than the temperature of liquid in the generator, the last-mentioned means including heat rejecting surface having equal capability for heat rejection during expulsion periods as during absorption periods.

22. A refrigerating system of the kind having periods of absorption at low pressure alternating with periods of vapor expulsion at higher pressure and having a liquid containing portion including a generator, an evaporator, conduits connecting said evaporator and liquid containing portion, variable heating means for said system, invariable cooling means for said system, and means within the system for lowering pressure in the generator at the beginning of absorption periods by circulation of absorption liquid of lower temperature than the temperature of liquid in the generator.

23. A refrigerating system of the kind having periods of absorption at low pressure alternating with periods of vapor expulsion at higher pressure and having a liquid containing portion including a generator, an absorption liquid storage reservoir, and means for circulating liquid between said reservoir and said generator during expulsion periods, an evaporator, conduits connecting said evaporator and liquid containing portion, variable heating means for said system, invariable cooling means for said system, and means within the system for lowering pressure in the generator by change of phase of refrigerant at the beginning of absorption periods, the last-mentioned means including heat rejecting surface having equal capability for heat rejection during expulsion periods as during absorption periods.

24. A refrigerating system of the kind having periods of absorption at low pressure alternating with periods of vapor expulsion at higher pressure and having a liquid containing portion including a generator, an absorption liquid storage reservoir, gas lift means for circulating liquid between said reservoir and said generator during expulsion periods and gas lift means for circulating liquid through said reservoir during absorption periods, an evaporator, conduits connecting said evaporator and liquid containing portion, variable heating means for said system, invariable cooling means for said system, and means within the system for lowering pressure in the generator by change of phase of refrigerant at the beginning of absorption periods, the last-mentioned means including heat rejecting surface having equal capability for heat rejection during expulsion periods as during absorption periods.

25. A refrigeration system of the kind having periods of absorption at low pressure alternating with periods of vapor expulsion at higher pressure and having a liquid containing portion including a generator, an evaporator, conduits connecting said evaporator and liquid containing portion, and means for circulating absorption liquid from a space of lower temperature than the generator into direct gas communication with vapor above the liquid in the generator.

26. A refrigeration system of the kind having periods of absorption at low pressure alternating with periods of vapor expulsion at higher pressure comprising a liquid containing portion including a generator, an evaporator, conduits connecting said evaporator and liquid containing portion, and means for circulating absorption liquid from a space of lower temperature than the generator into a space separate from the generator and in direct gas communication with vapor above the liquid in the generator.

27. Absorption refrigeration apparatus of the kind having low pressure periods of absorption alternating with higher pressure periods of vapor expulsion including an unheated storage reservoir adapted to hold the bulk of the absorption liquid in the apparatus, a vapor expeller of the vapor lift type including a conduit for flow of liquid and vapor expelled therefrom having a channel so small that vapor bubbles extend substantially full width of the channel, a liquid heat exchanger, a separation chamber, conduits connecting the heat exchanger with the reservoir, a conduit connecting the heat exchanger with the expeller, a conduit connecting the heat exchanger with the separation chamber by-passing the expeller, and said expeller being connected to said separation chamber.

28. In an absorption refrigeration system having low pressure periods of refrigerant evaporation and absorption alternating with higher pressure periods of vapor expulsion and condensation, an absorption liquid reservoir adapted to hold the bulk of absorption liquid in relatively cold condition during expulsion periods, gas and liquid separation means, members providing a circulation circuit for liquid between said reservoir and said separating means, an evaporator, and means for establishing a path of flow for refrigerant gas between the evaporator and absorption liquid during absorption periods subject to high pressure influence due to liquid column and subject to low pressure influence due to a body of absorption liquid separate from liquid in said separating means.

29. In an absorption refrigeration system having low pressure periods of refrigerant evaporation and absorption alternating with higher pressure periods of vapor expulsion and condensation, an absorption liquid reservoir adapted to hold the bulk of absorption liquid in relatively cold condition during expulsion periods, gas and liquid separation means, members providing a circulation circuit for liquid between said reservoir and said separating means, an evaporator, means to maintain absorption liquid at lower temperature than liquid in said separating means during expulsion periods, and means for establishing a path of flow for refrigerant gas between the evaporator and absorption liquid during absorption periods subject to high pressure influence due to liquid column and subject to low pressure influence due to said liquid maintained at lower temperature.

30. In an absorption refrigeration system having low pressure periods of refrigerant evaporation and absorption alternating with higher pressure periods of vapor expulsion and condensation, an absorption liquid reservoir adapted to hold the bulk of absorption liquid in relatively cold condition during expulsion periods, a heated zone, gas and liquid separation means, members providing a circulation circuit for liquid between said reservoir and said separating means, an evaporator, means to hold absorption liquid at a higher elevation than liquid in said heated zone during expulsion periods and at lower temperature than liquid in said heated zone, and means for establishing a path of flow for refrigerant gas between the evaporator and absorption liquid during absorption periods subject to high pressure influence due to liquid column and subject to low pressure influence due to said higher elevation liquid.

31. In a refrigerating system having periods of refrigerant evaporation and absorption at low pressure alternating with periods of vapor expulsion at higher pressure, structure for containing absorption liquid in cold condition during expulsion periods including a reservoir adapted to hold the bulk of absorption liquid, a thermosiphon element, conduits for circulation of liquid between said structure and said thermosiphon element, said structure extending above said thermosiphon element, and means to admit refrigerant vapor to said structure above said thermosiphon element.

32. In a refrigerating system having periods of refrigerant evaporation at low pressure alternating with periods of expulsion of vapor from solution at higher pressure, structure for containing absorption liquid in cold condition during expulsion periods including an upper vessel and a lower vessel, a plurality of vertically extending conduits connecting said vessels, a thermosiphon element, conduits for circulation of liquid between said structure and said thermosiphon element, an evaporator, and means to conduct vapor from the evaporator and introduce it into one of said vertically extending conduits.

33. In an absorption refrigeration system having low pressure periods of refrigerant evaporation and absorption alternating with higher pressure periods of vapor expulsion and condensation, structure for containing absorption liquid in cold condition during expulsion periods including an upper vessel and a lower vessel, a plurality of vertically extending conduits connecting said vessels, a thermosiphon element, conduits for circulation of liquid between said structure and said thermosiphon element, an evaporator, and means to conduct vapor from the evaporator and introduce it into one of said vertically extending conduits at a higher level than said thermosiphon.

34. In an absorption refrigeration system having low pressure periods of refrigerant evaporation and absorption alternating with higher pressure periods of vapor expulsion and condensation, structure for containing absorption liquid in cold condition during expulsion periods including an upper vessel and a lower vessel, a plurality of vertically extending conduits connecting said vessels, a thermosiphon element, conduits for circulation of liquid between said structure and said thermosiphon element, an evaporator, and means to conduct vapor from the evaporator and from the thermosiphon and introduce said vapor into one of said vertically extending conduits above said thermosiphon.

35. In a refrigerating system having periods of refrigerant evaporation at low pressure alternating with periods of expulsion of vapor from solution at higher pressure, structure for containing absorption liquid in cold condition during expulsion periods including an upper vessel and a lower vessel, a plurality of vertically extending conduits connecting said vessels, a thermosiphon element, conduits for circulation of liquid between said structure and said thermosiphon element, an evaporator, and means to conduct vapor from the evaporator and introduce it into one of said vertically extending conduits, said upper vessel being situated at a higher elevation than said thermosiphon.

36. In an absorption refrigeration system having low pressure periods of refrigerant evaporation and absorption alternating with higher pressure periods of vapor expulsion and condensation, structure for containing absorption liquid in cold condition during expulsion periods including an upper vessel and a lower vessel, a plurality of vertically extending conduits connecting said vessels, a thermosiphon element, conduits for circulation of liquid between said structure and said thermosiphon element, the last mentioned conduits being arranged to form a heat exchanger, an evaporator, means to conduct vapor from the evaporator and introduce it into one of said vertically extending conduits, and said upper vessel being situated above said heat exchanger.

37. In a refrigerating system having periods of refrigerant evaporation at low pressure alternating with periods of expulsion of vapor from solution at higher pressure, structure for containing absorption liquid in cold condition during expulsion periods including an upper vessel and a lower vessel, a plurality of vertically extending conduits connecting said vessels, a thermosiphon element, conduits for circulation of liquid between said structure and said thermosiphon element, an evaporator, and means to conduct vapor from the evaporator and introduce it into one of said vertically extending conduits, said upper vessel being situated above said thermosiphon element and said lower vessel being situated below said thermosiphon element.

38. An absorption refrigeration system having periods of absorption at low pressure alternating with periods of vapor expulsion from absorption liquid at higher pressure comprising a storage reservoir of sufficient volume to hold the bulk of the absorption liquid, members including a cooling element connected to said storage reservoir to form a first liquid circulation circuit, members connected to said storage reservoir to form a second liquid circulation circuit, an evaporator, and conduits connecting said evaporator with both said circuits, said second circuit including means alternately heated and cooled and causing formation of a liquid column head during the absorption periods for forcing evaporated gas into the absorber and neutralizing said column on application of heat during the expulsion periods, said last mentioned means operating between wider temperature values than the contents of the storage reservoir.

39. In absorption refrigeration apparatus having periods of absorption at low pressure alternating with periods of vapor expulsion at higher pressure, the improvement which consists in maintaining the bulk of the absorption liquid cool during both the expulsion periods and the absorption periods and circulating absorption liquid both during the expulsion periods and during the absorption periods due to the lifting action of refrigerant vapor in narrow pipes.

40. An absorption refrigerating process of the kind having periods of vapor absorption at low pressure alternating with periods of vapor expulsion at higher pressure characterized in that during a given time increment of the expulsion period only a small part of the absorption liquid is heated and vapor expelled therefrom, and that, during the absorption period, absorption liquid is circulated in a path independent of the generator through a zone which is exposed to an external cooling medium both during the expulsion period and the absorption period, while refrigerant vapor is returned to said path, and that, during the expulsion period, heat is exchanged between liquid flowing to the heated zone and liquid flowing from the heated zone.

41. In absorption refrigeration apparatus of the kind having alternate periods of absorption at low pressure and expulsion of refrigerant from solution at higher pressure, a member heated during the expulsion period, a storage reservoir of sufficient volume to hold the bulk of the absorption liquid in the system, members forming a circuit for circulation of absorption liquid through said reservoir including an upwardly extending conduit, an evaporator, and means to conduct gas from the evaporator and from said heated member to said circuit at the beginning of the absorption period.

42. In absorption refrigeration apparatus of the kind having alternate periods of absorption at low pressure and expulsion of refrigerant from solution at higher pressure, a storage reservoir of sufficient volume to hold the bulk of the absorption liquid in the system, members forming a circuit for circulation of absorption liquid through said reservoir including an upwardly extending conduit, an evaporator, a member heated during the expulsion period, and means to conduct gas from the last-mentioned member and the evaporator to said circuit at the beginning of the absorption period to produce circulation in said liquid due to rise of gas in said upwardly extending conduit and to decrease pressure in the last-mentioned member.

43. In absorption refrigeration apparatus of the kind having alternate periods of absorption at low pressure and expulsion of refrigerant from solution at higher pressure, a generator, an evaporator, a storage reservoir of sufficient volume to hold the bulk of absorption liquid in the system, members forming a circuit for circulation of liquid through said reservoir including an upwardly extending conduit, and means to conduct vapor from said evaporator and said generator to said circuit.

44. In absorption refrigeration apparatus of the kind having alternate periods of absorption at low pressure and expulsion of refrigerant at higher pressure, the improvement which consists in circulating liquid between a main body of absorption liquid and a heated zone during the expulsion periods, stopping application of heat to said zone, circulating absorption liquid in a different path during the absorption periods, and conducting refrigerant vapor from heat exchange relation with the body to be cooled and from the previously heated zone to said path after the application of heat has stopped.

45. In absorption refrigeration apparatus of the kind having alternate periods of absorption at low pressure and expulsion at higher pressure, the improvement which consists in circulating liquid between a large body of absorption liquid maintained at low temperature and a heated zone of small volume during the expulsion periods, circulating absorption liquid in a different path during the absorption periods, and conducting refrigerant vapor from heat exchange relation with the body to be cooled and from said zone to said path to be absorbed.

46. In an absorption refrigeration system having low pressure periods of refrigerant evaporation and absorption alternating with higher pressure periods of vapor expulsion and wherein the quantity of solution is increased during absorption periods and decreased during expulsion periods, means to hold the absorption liquid in a number of separate parts, means to convey vapor from one part to be condensed and accumulated for evaporation, and members forming a continuous circuit for flow of absorption liquid during expulsion periods including means to flow rich absorption liquid to said one part and flow weak absorption liquid therefrom and including a conduit for flow of liquid and vapor expelled therefrom having a channel so small that vapor bubbles extend substantially full width of the channel, to obtain uniformity of flow of liquid while quantity of absorption liquid varies.

47. In an absorption refrigeration system having low pressure periods of refrigerant evaporation and absorption alternating with higher pressure periods of vapor expulsion and wherein the quantity of solution is increased during absorption periods and decreased during expulsion periods, means to hold the absorption liquid in a number of separate parts, means to convey vapor from one part to be condensed and accumulated for evaporation, and members forming a continuous circuit for flow of absorption liquid during expulsion periods including means to flow rich absorption liquid to said one part and flow weak absorption liquid therefrom and including a conduit having a channel so small that vapor bubbles extend substantially full width of the channel, to obtain uniformity of flow of liquid while quantity of absorption liquid varies, and means to apply heat directly to said conduit.

48. In an absorption refrigeration system having low pressure periods of refrigerant evaporation and absorption alternating with higher pressure periods of vapor expulsion and wherein the quantity of solution is increased during absorption periods and decreased during expulsion periods, an absorption liquid reservoir adapted to hold the bulk of absorption liquid cool during expulsion periods, a gas and liquid separator, a volume variation vessel, and means to conduct rich absorption liquid from said reservoir and said volume variation vessel to said separator and conduct weak absorption liquid from said separator to said reservoir including a conduit for flow of liquid and vapor expelled therefrom having a channel so small that gas and liquid cannot pass each other therein, to obtain uniformity of flow of liquid while quantity of absorption liquid varies.

49. In a refrigerating system containing refrigerant and absorption liquid and having low pressure periods of refrigerant evaporation and absorption alternating with higher pressure periods of vapor expulsion, the improvement in the process of the higher pressure period which consists in heating the absorption liquid a little at a time to vapor expulsion temperature to expel refrigerant vapor, producing flow of the absorption liquid so as to be heated a little at a time due to the lifting action of vapor expelled therefrom in a channel so small that vapor bubbles extend substantially full width of the channel, cooling the absorption liquid deprived of refrigerant while continuing the heating of more absorption liquid, and keeping the cooled liquid out of the presence of vapor.

50. A process of refrigerating having low pressure periods of refrigerant evaporation and absorption alternating with higher pressure periods of vapor expulsion which comprises: during the vapor expulsion period, heating absorption liquid having refrigerant dissolved therein a little at a time to expel refrigerant therefrom, cooling the absorption liquid deprived of refrigerant while continuing the heating of more absorption liquid, storing the cooled absorption liquid, isolating the stored cool liquid from the expelled vapor, liquefying the expelled refrigerant and accumulating the liquefied refrigerant; during the absorption period, discontinuing the heating for expulsion of refrigerant from solution and producing flow of refrigerant vapor from the liquefied refrigerant to weakened absorption liquid; throughout both periods maintaining constant heat rejecting facility except as modified by variation in heating; and correlating, due to alteration of space relation of fluid portions and flow of fluids of the process, the heat rejection of the different periods to the heat rejecting facility, and causing said alteration solely by the variation in heating.

51. A process of refrigerating having low pressure periods of refrigerant evaporation and absorption alternating with higher pressure periods of vapor expulsion which comprises: during the vapor expulsion period, heating absorption liquid having refrigerant dissolved therein a little at a time to expel refrigerant therefrom, producing flow of the absorption liquid so as to be heated a little at a time due to the lifting action of vapor expelled therefrom in a channel so small that vapor bubbles extend substantially full width of the channel, cooling the absorption liquid deprived of refrigerant while continuing the heating of more absorption liquid, storing the cooled absorption liquid, maintaining the stored cool liquid free of gas environment, liquefying the expelled refrigerant and accumulating the liquefied refrigerant; and, during the absorption period, discontinuing the heating for expulsion of refrigerant from solution and producing flow of refrigerant vapor from the liquefied refrigerant to weakened absorption liquid.

52. A process of refrigeration having low pressure periods of refrigerant evaporation and absorption alternating with higher pressure periods of vapor expulsion which comprises: during the vapor expulsion period, heating absorption liquid having refrigerant dissolved therein a little at a time to expel refrigerant therefrom, cooling the weakened absorption liquid deprived of refrigerant while continuing the heating of more absorption liquid by passing the weakened absorption liquid in heat exchange relation with strong absorption liquid passing to the heating zone, storing the cooled absorption liquid, maintaining cool absorption liquid free of gas environment at lower pressure than liquid being vaporized, liquefying the expelled refrigerant and accumulating the liquefied refrigerant; and, during the absorption period, discontinuing the heating for expulsion of refrigerant from solution, flowing vapor from residual hot absorption liquid to said lower pressure cool absorption liquid and producing flow between the liquefied refrigerant and weakened absorption liquid.

53. A process of refrigerating having low pressure periods of refrigerant evaporation and absorption alternating with higher pressure periods of vapor expulsion which comprises: during the vapor expulsion period, heating absorption liquid having refrigerant dissolved therein a little at a time to expel refrigerant therefrom, cooling the absorption liquid deprived of refrigerant while continuing the heating of more absorption liquid, storing the cooled absorption liquid, maintaining the stored cool liquid in a body free of gas environment, preventing access of expelled vapor to the stored cool liquid by interposing a stagnant surface layer of absorption liquid, liquefying the expelled refrigerant and accumulating the liquefied refrigerant; and, during the absorption period, discontinuing the heating for expulsion of refrigerant from solution and producing flow of refrigerant vapor from the liquefied refrigerant to weakened absorption liquid.

54. A process of refrigerating having low pressure periods of refrigerant evaporation and absorption alternating with higher pressure periods of vapor expulsion which comprises: during the vapor expulsion period, heating absorption liquid having refrigerant dissolved therein a little at a time to expel refrigerant therefrom, cooling the absorption liquid deprived of refrigerant while continuing the heating of more absorption liquid, storing the cooled absorption liquid, maintaining the stored cool liquid free of gas environment, preventing access of expelled vapor to the stored cool liquid by interposing a stagnant surface layer of strong absorption liquid, maintaining said strong layer at a higher temperature than said stored cool liquid, liquefying the expelled refrigerant and accumulating the liquefied refrigerant; and, during the absorption period, discontinuing the heating for expulsion of refrigerant from solution and producing flow of refrigerant vapor from the liquefied refrigerant to weakened absorption liquid.

55. In a refrigerating system containing refrigerant and absorption liquid and having low pressure periods of refrigerant evaporation and absorption alternating with -higher pressure periods of vapor expulsion, the improvement in the process of the higher pressure period which consists in heating the absorption liquid a little at a time to vapor expulsion temperature to expel refrigerant vapor, cooling the absorption liquid deprived of refrigerant while continuing the heating of more absorption liquid, and keeping the cooled liquid and expelled vapor out of the presence of each other by the interposition of a free stagnant surface layer of strong absorption liquid having small horizontal extent relative to the quantity of absorption liquid cooled during the higher pressure period.

56. In a refrigerating system containing refrigerant and absorption liquid and having low pressure periods of refrigerant evaporation and absorption alternating with higher pressure periods of vapor expulsion, the improvement in the process of the higher pressure period which consists in heating the absorption liquid a little at a time to vapor expulsion temperature to expel refrigerant vapor, cooling the absorption liquid deprived of refrigerant internally of the system while continuing the heating of more absorption liquid, maintaining absorption liquid free of gas environment at a higher elevation than liquid being heated, and applying external cooling to said absorption liquid at higher elevation.

57. In a refrigeration system containing refrigerant and absorption liquid and having low pressure periods of refrigerant evaporation and absorption alternating with higher pressure periods of vapor expulsion, the improvement which consists in dividing the absorption liquid during higher pressure periods into a plurality of portions, three of said portions comprising, aside from a sealing portion between condensate and absorption liquid, a main body of absorption liquid, a portion adapted to be heated, and a stagnant surface layer portion.

58. In a refrigeration system containing refrigerant and absorption liquid and having low pressure periods of refrigerant evaporation and absorption alternating with higher pressure periods of vapor expulsion, the improvement which consists in dividing the absorption liquid during higher pressure periods into a plurality of separate portions, three of said portions comprising a main body of absorption liquid, a portion adapted to be heated, and a volume variation portion having a stagnant surface layer, circulating absorption liquid between the main body and the portion to be heated, and restricting transfer of liquid between the main body and the volume variation portion.

59. In a refrigeration system containing refrigerant and absorption liquid and having low pressure periods of refrigerant evaporation and absorption alternating with higher pressure periods of vapor expulsion, the improvement which consists in dividing the absorption liquid during higher pressure periods into a plurality of separate portions, three of said portions comprising a main body of absorption liquid, a portion adapted to be heated, and a volume variation portion having a stagnant surface layer, maintaining a temperature difference between the main body and the portion adapted to be heated during the higher pressure period, and maintaining a temperature difference between the main body and the volume variation portion during the higher pressure period.

60. In a refrigeration system containing refrigerant and absorption liquid and having low pressure periods of refrigerant evaporation and absorption alternating with higher pressure periods of vapor expulsion, the improvement which consists in dividing the absorption liquid during higher pressure periods into a plurality of portions, three of said portions comprising a main body of absorption liquid, a portion adapted to be heated, and a stagnant surface layer portion, circulating absorption liquid between the main body and the portion to be heated during the higher pressure period, restricting liquid transfer between the main body and the surface layer portion during the higher pressure period, maintaining a temperature difference between the main body and the portion to be heated during the higher pressure period, and maintaining a temperature difference between the main body and the surface layer portion during the higher pressure period.

61. In a process of refrigeration including alternate periods of generation and absorption of refrigerant vapor, that improvement which consists in maintaining a main body of absorption solution, withdrawing solution from said main body during the generation period in the form of a small continuous stream, expelling refrigerant vapor from said stream, separating the expelled vapor from said stream, returning the resulting weak solution to said main body due to the lifting action of the expelled vapor, and maintaining pressure translation between the separated vapor and main body of solution during the generation periods through a relatively small and stagnant surface layer of solution of small horizontal extent relative to the main body.

62. In the process of refrigeration including alternate periods of generation and absorption of refrigerant vapor, that improvement which consists in maintaining a main body of absorption solution, continuously cooling said body, withdrawing solution from said body during the generation period in the form of a small continuous stream, heating said stream to expel refrigerant fluid therefrom, separating the expelled vapor from said stream, maintaining communication between said separated vapor and main body of solution through a relatively small stagnant surface layer of solution, and maintaining said surface layer at a higher temperature than said main body.

63. In the process of refrigeration having low pressure periods of refrigerant evaporation and absorption alternating with higher pressure periods of vapor expulsion, that improvement which consists in separately maintaining a first body of absorption liquid and a second body of absorption liquid, raising the temperature of said first body to expel refrigerant vapor therefrom at the higher pressure, circulating liquid between said bodies during the higher pressure periods, continuously preventing accumulation of gas above said second body, and maintaining a stagnant surface layer portion of absorption liquid in direct gas communication with the vapor space above said first body and in liquid communication with said second body.

64. In the process of refrigeration having low pressure periods of refrigerant evaporation and absorption alternating with higher pressure periods of vapor expulsion, that improvement which consists in separately maintaining a first body of absorption liquid and a second body of absorption liquid, raising the temperature of said first body to expel refrigerant vapor therefrom at the higher pressure, circulating liquid between said bodies during the higher pressure periods, continuously preventing accumulation of gas above said second body, maintaining a stagnant surface layer portion of absorption liquid in direct gas communication with the vapor space above said first body and in liquid communication with said second body during the higher pressure periods, and maintaining said surface layer portion at a higher temperature than said second body during the higher pressure periods.

65. In the process of refrigeration having low pressure periods of refrigerant evaporation and absorption alternating with higher pressure periods of vapor expulsion, that improvement which consists in separately maintaining a first body of absorption liquid and a second body of absorption liquid, raising the temperature of said first body to expel refrigerant vapor therefrom at the higher pressure, exchanging liquid in thermal transfer relation between said bodies, maintaining said second body during higher pressure periods at a temperature at least as low as during the absorption periods, and maintaining a stagnant surface layer portion of said second body in direct gas communication with the vapor space above said first body and in liquid communication with said second body during the higher pressure periods.

66. In a refrigeration system containing refrigerant and absorption liquid and having low pressure periods of refrigerant evaporation and absorption alternating with higher pressure periods of vapor expulsion, the improvement which consists in providing separate spaces for storage of cooled absorption liquid, for expelling refrigerant from absorption liquid and for variation of solution volume, and circulating liquid between the expulsion space and the storage space while maintaining a still body of liquid in the volume variation space during the higher pressure period.

67. In a process of refrigeration having low pressure periods of refrigerant evaporation and absorption alternating with higher pressure periods of vapor expulsion, that improvement which consists in maintaining a body of absorption solution in a low temperature zone free of gas environment, and circulating solution from said body in the form of a stream having an upward path through an intermittently highly heated zone to cause generation of refrigerant vapor, said path being so narrow that vapor formed extends substantially full width of the path and having such vertical length of narrow width as to cause said circulation.

68. In a process of refrigeration having low pressure periods of refrigerant evaporation and absorption alternating with higher pressure periods of vapor expulsion, that improvement which consists in maintaining a body of absorption solution, withdrawing solution from said body during a higher pressure period in the form of a small continuous stream, expelling refrigerant vapor from said stream, separating the expelled vapor from said stream, conducting the stream between the point of expulsion and the point of separation through an appreciable extent of vertical channel so narrow that vapor bubbles extend substantially full width of the channel, and returning the resulting weak solution to said body of solution out of heat exchange relation with expelled refrigerant in the stream.

69. In a process of refrigeration having low pressure periods of refrigerant evaporation and absorption alternating with higher pressure periods of vapor expulsion maintaining a body of cold absorption liquid during the higher pressure periods, flowing absorption solution in an endless circuit during the absorption periods out of and back to said body, withdrawing solution from said circuit during the higher pressure periods in the form of a small continuous stream, expelling refrigerant vapor from said stream, separating the expelled vapor from said stream, and returning the resulting weak solution to said circuit.

70. In a process of refrigeration having low pressure periods of refrigerant evaporation and absorption alternating with higher pressure periods of vapor expulsion maintaining a body of cold absorption liquid during the higher pressure periods, flowing absorption solution in an endless circuit during the absorption periods out of and back to said body, continuously applying external cooling to solution in said circuit, withdrawing solution from said circuit during the higher pressure periods in the form of a small continuous stream, heating said stream to expel refrigerant vapor therefrom, separating the expelled vapor from said stream, and returning the resulting weak solution to said circuit in thermal exchange relation with said stream of withdrawn solution.

71. In a process of refrigeration having low pressure periods of refrigerant evaporation and absorption alternating with higher pressure periods of vapor expulsion maintaining a body of cold absorption liquid during the higher pressure periods, flowing absorption solution in an endless circuit during the absorption periods out of and back to said body, continuously applying an external cooling agent to solution in said circuit, withdrawing solution from said circuit during the higher pressure periods in the form of a small continuous stream, heating said stream to expel refrigerant vapor therefrom, utilizing the expelled vapor to cause flow of said stream back to said circuit, separating the expelled vapor from said stream, condensing the vapor to liquid, then evaporating the liquid during the absorption periods, and introducing the resulting vapor into said circuit to cause absorption of the vapor and said flow of solution therein.

72. In a process of refrigeration having low pressure periods of refrigerant evaporation and absorption alternating with higher pressure periods of vapor expulsion, flowing absorption solution in an endless circuit during the absorption periods, continuously applying external cooling to solution in said circuit, withdrawing solution from said circuit during the higher pressure periods in the form of a small continuous stream, heating said stream to expel refrigerant vapor therefrom, utilizing the expelled vapor to cause flow of said stream back to said circuit, separating the expelled vapor from said stream, maintaining communication between said separated vapor and said body of solution through a relatively small stagnant surface layer of absorption liquid, condensing the vapor to liquid, then evaporating the liquid during the absorption periods, and introducing the resulting vapor into solution in said circuit to cause absorption of the vapor and said flow of solution therein.

73. Refrigeration apparatus containing refrigerant and absorption liqu'1 comprising an evaporator, a generator, member connected thereto containing absorption liquid including a reservoir, means to alternately maintain the generator above and below vapor expulsion temperature, means to conduct refrigerant from the generator and liquefy said refrigerant and introduce said refrigerant into the evaporator while the generator is above vapor expulsion temperature and to conduct refrigerant vapor from the evaporator to one of the members containing absorption liquid while the generator is below vapor expulsion temperature, means to maintain the reservoir below vapor expulsion temperature both while the generator is above vapor expulsion temperature, and while the generator is below vapor expulsion temperature, and means to circulate liquid between the reservoir and the generator while the generator is above vapor expulsion temperature including a vapor lift and a liquid heat exchanger, said vapor lift including a conduit for flow of liquid and vapor expelled therefrom having a channel so small that vapor bubbles extend substantially full width of the channel.

74. Refrigeration apparatus containing refrigerant and absorption liquid comprising an evaporator, a generator, an absorber, means to alternately maintain the generator above and below vapor expulsion temperature, means to conduct refrigerant from the generator and liquefy said refrigerant and introduce said refrigerant into the evaporator while the generator is above expulsion temperature and to conduct refrigerant vapor from the evaporator to the absorber while the generator is below vapor expulsion temperature, means to maintain the absorber below vapor expulsion temperature both while the generator is above vapor expulsion temperature and while the generator is below vapor expulsion temperature, means to circulate liquid through the generator while the generator is above vapor expulsion temperature, and means to circulate liquid in a circuit through the absorber and independently of the generator while the generator is below vapor expulsion temperature.

75. Refrigeration apparatus containing refrigerant and absorption liquid comprising an evaporator, a generator, an absorber, means to alternately maintain the generator above and below vapor expulsion temperature, means to conduct refrigerant from the generator and liquefy said refrigerant and introduce said refrigerant into the evaporator while the generator is above vapor expulsion temperature and to conduct refrigerant vapor from the evaporator to the absorber while the generator is below vapor expulsion temperature, means to maintain the absorber below vapor expulsion temperature both while the generator is above vapor expulsion temperature and while the generator is below vapor expulsion temperature, gas-lift means to circulate liquid in a circuit through the generator while the generator is above vapor expulsion temperature, and gas-lift means to circulate liquid in a circuit through the absorber and independently of the generator while the generator is below vapor expulsion temperature.

76. Absorption refrigeration apparatus comprising an evaporator, a generator, members connected thereto containing absorption liquid including a reservoir, said reservoir being capable of holding an appreciably greater quantity of liquid than said generator, means to alternately maintain the generator above and below vapor expulsion temperature, means to conduct refrigerant from the generator and liquefy said refrigerant and introduce said refrigerant into the evaporator to accumulate therein while the generator is above vapor expulsion temperature and to conduct refrigerant vapor from the evaporator to one of the members containing absorption liquid while the generator is below vapor expulsion temperature, means to maintain the reservoir below vapor expulsion temperature both while the generator is above vapor expulsion temperature and while the generator is below vapor expulsion temperature, means to circulate liquid between the generator and the reservoir while the generator is above vapor expulsion temperature, and means to maintain a stagnant condition of absorption liquid surface in communication with said reservoir and in gas communication with said generator while said generator is above vapor expulsion temperature.

77. Absorption refrigeration apparatus comprising an evaporator, a generator, members connected thereto containing absorption liquid including a reservoir, said reservoir being capable of holding an appreciably greater quantity of liquid than said generator, means to alternately maintain the generator above and below vapor expulsion temperature, means to conduct refrigerant from the generator and liquefy said refrigerant and introduce said refrigerant into the evaporator to accumulate therein while the generator is above vapor expulsion temperature and to conduct refrigerant vapor from the evaporator to one of the members containing absorption liquid while the generator is below vapor expulsion temperature, means to circulate liquid between the reservoir and the generator, a vessel having non-circulatory communication with said reservoir for maintaining a surface of absorption liquid in stagnant condition, and a vapor connection between said generator and said vessel.

78. Absorption refrigeration apparatus comprising an evaporator, a generator, members connected thereto containing absorption liquid including a reservoir, said reservoir being capable of holding an appreciably greater quantity of liquid than said generator, means to alternately maintain the generator above and below vapor expulsion temperature, means to conduct refrigerant from the generator and liquefy said refrigerant and introduce said refrigerant into the evaporator to accumulate therein while the generator is above vapor expulsion temperature and to conduct refrigerant vapor from the evaporator to one of the members containing absorption liquid and maintain a liquid column while the generator is below vapor expulsion temperature, means to maintain the reservoir below vapor expulsion temperature both while the generator is above vapor expulsion temperature and while the generator is below vapor expulsion temperature, means to circulate liquid between the reservoir and the generator, a vessel having non-circulatory communication with said reservoir for maintaining a surface of absorption liquid in stagnant condition, and a vapor connection between said generator and said vessel.

79. Absorption refrigeration apparatus comprising an evaporator, a generator, members connected thereto containing absorption liquid including a reservoir, said reservoir being capable of holding an appreciably greater quantity of liquid than said generator, means to alternately maintain the generator above and below vapor expulsion temperature, means to conduct refrigerant from the generator and liquefy said refrigerant and introduce said refrigerant into the evaporator to accumulate therein while the generator is above vapor expulsion temperature and to conduct refrigerant vapor from the evaporator to one of the members containing absorption liquid and maintain a liquid column while the generator is below vapor expulsion temperature, means to maintain the reservoir below vapor expulsion temperature both while the generator is above vapor expulsion temperature and while the generator is below vapor expulsion temperature, thermosiphon means to circulate liquid between the reservoir and the generator, a vessel extending above the reservoir and having non-circulatory communication therewith for maintaining a surface of absorption liquid in stagnant condition, a vapor connection between said generator and said vessel, means to maintain said vessel at higher temperature than said reservoir, and a liquid heat exchanger in the circuit between the generator and the reservoir.

80. In a refrigeration system, a first vessel for holding a main body of absorption liquid, a second vessel having non-circulatory liquid communication with said first vessel for maintaining a surface of absorption liquid in stagnant condition, a generator, means to circulate liquid between said generator and said first vessel, and a vapor connection between said second vessel and said generator.

81. In a refrigeration system, a reservoir for holding a main body of absorption liquid, a vessel having non-circulatory communication with said reservoir for maintaining a surface of absorption liquid in stagnant condition and for volume variation of solution, a generator, means to circulate liquid between said generator and said reservoir, means to produce a temperature gradient between said reservoir and said vessel, and means to produce a temperature gradient between said reservoir and said generator.

82. In a refrigeration system, a reservoir for holding a main body of absorption liquid, a vessel having non-circulatory communication with said reservoir for maintaining a surface of absorption liquid in stagnant condition and for volume variation of solution, a generator, means to circulate liquid between said generator and said reservoir, means to produce a temperature gradient between said reservoir and said vessel, and means to produce a temperature gradient between said reservoir and said generator, said reservoir being continuously exposed to the cooling effect of air.

83. In an absorption refrigeration system, an evaporator, an absorption liquid section, means to conduct refrigerant from a heated portion of said absorption liquid section to said evaporator, means to conduct vapor from said evaporator to an unheated portion of said absorption liquid section, said conducting means being constructed and arranged to prevent flow through the one while flow takes place through the other, and said absorption liquid section including a first liquid containing element for expulsion of refrigerant, a second liquid containing element for liquid volume variation of solution, and a third liquid containing element for external withdrawal of heat from the solution.

84. In an absorption refrigeration system, an evaporator, an absorption liquid section, means to conduct refrigerant from a heated portion of said absorption liquid section to said evaporator, means to conduct vapor from said evaporator to an unheated portion of said absorption liquid section, said conducting means being constructed and arranged to prevent flow through the one while flow takes place through the other, and said absorption liquid section including a first liquid containing element for expulsion of refrigerant vapor, a second liquid containing element for volume variation of solution, and a third liquid containing element for holding the greater part of the solution.

85. In an absorption refrigeration system, an evaporator, an absorption liquid section, means to conduct refrigerant from a heated portion of said absorption liquid section to said evaporator, means to conduct vapor from said evaporator to an unheated portion of said absorption liquid section, said conducting means being constructed and arranged to prevent flow through the one while flow takes place through the other, and said absorption liquid section including a first vessel for holding the greater part of the absorption liquid arranged and connected in the system so as to be filled with liquid when refrigerant is flowing to the evaporator, a generator, a second vessel for volume variation of solution, a liquid heat exchanger, and means to circulate liquid between the generator and said first vessel through the heat exchanger without passing through said second vessel.

86. In an absorption refrigeration system, an evaporator, an absorption liquid section, means to conduct refrigerant from a heated portion of said absorption liquid section to said evaporator, means to conduct vapor from said evaporator to an unheated portion of said absorption liquid section, said conducting means being constructed and arranged to prevent flow through the one while flow takes place through the other, and said absorption liquid section including a first vessel for holding the greater part of the absorption liquid arranged and connected in the system so as to be filled with liquid when refrigerant is flowing to the evaporator, a second vessel for volume variation of solution, an absorption liquid cooling element, and means for circulating liquid between said first vessel and said cooling element when refrigerant is flowing from the evaporator.

87. In an absorption refrigeration system, an evaporator, an absorption liquid section, means to conduct refrigerant from a heated portion of said absorption liquid section to said evaporator, means to conduct vapor from said evaporator to an unheated portion of said absorption liquid section, said conducting means being constructed and arranged to prevent flow through the one while flow takes place through the other, and said absorption liquid section including a first vessel for holding the greater part of the absorption liquid arranged and connected in the system so as to be filled with liquid when refrigerant is flowing to the evaporator, a second vessel for volume variation of solution, an absorption liquid cooling element continuously subject to the cooling influence of atmospheric air, and means for circulating liquid between said first vessel and said cooling element when refrigerant is flowing from the evaporator.

88. In an absorption refrigeration apparatus operating with alternate periods of absorption at low pressure and expulsion at higher pressure, means to accumulate expelled refrigerant vapor as liquid preparatory to evaporation, a volume variation vessel adapted to have variation of quantity of liquid therein and with a capacity which is at least equal to the amount of refrigerant accumulated in a period, a generator incapable of holding as much liquid as is accumulated in a period, a vessel adapted to hold the greater part of the absorption liquid, means to maintain the contents of said vessel cold during higher pressure periods, and means to circulate absorption liquid between the last mentioned vessel and said generator.

89. In a combination, a heat operated intermittent refrigerating apparatus comprising an evaporator and a conduit member through which at a predetermined point of the operating cycle a sudden flow of warm fluid takes place, a thermostatic device comprising two co-operating thermostatic systems, both of which are capable of restricting the heat supply to the apparatus, the first system being adapted to restrict the heat supply in response to a lowering of the evaporator temperature, the second system being adapted to quickly restrict the heat supply in response to the setting up of the aforementioned sudden flow of warm fluid, and means associated with the second system to retard re-opening of the heat supply.

90. A process of refrigerating having low pressure periods of refrigerant evaporation and absorption alternating with higher pressure periods of vapor expulsion which comprises: during the vapor expulsion period, heating absorption liquid having refrigerant dissolved therein a little at a time to expel refrigerant therefrom, cooling the absorption liquid deprived of refrigerant while continuing the heating of more absorption liquid by passing the weakened liquid in heat transfer relation with strong absorption liquid passing to the heating zone, storing the cooled absorption liquid, isolating the stored cool liquid from the expelled vapor, liquefying the expelled refrigerant and accumulating the liquefied refrigerant; and, during the absorption period, discontinuing the heating for expulsion of refrigerant from solution, flowing refrigerant vapor from the remaining heated absorption liquid to cool weakened absorption liquid, and producing flow of refrigerant vapor from the liquefied refrigerant to weakened absorption liquid.

91. An absorption refrigeration system having low pressure periods of refrigerant evaporation and absorption alternating with higher pressure periods of expulsion of refrigerant from solution including expulsion means, means for circulating absorption liquid outside the expulsion means during both expulsion and absorption periods, and heat dissipating means separate from the expulsion means of sufficient capacity to reject the entire heat of absorption to be dissipated during any time increment continuously exposed to the influence of an external cooling medium.

CARL GEORG MUNTERS.